US005470526A

United States Patent [19]

Wilfong et al.

[11] Patent Number: 5,470,526
[45] Date of Patent: * Nov. 28, 1995

[54] DEGRADABLE MULTILAYERED STRUCTURES

[75] Inventors: Debra L. Wilfong, Lake Elmo; Denise R. Rutherford; Richard J. Rolando, both of Oakdale, all of Minn.

[73] Assignee: Minnesota Mining and Manufacturing Company, St. Paul, Minn.

[ * ] Notice: The portion of the term of this patent subsequent to Jun. 1, 2010, has been disclaimed.

[21] Appl. No.: 104,147

[22] PCT Filed: Dec. 4, 1992

[86] PCT No.: PCT/US92/10718

§ 371 Date: Aug. 18, 1993

§ 102(e) Date: Aug. 18, 1993

Related U.S. Application Data

[63] Continuation-in-part of Ser. No. 806,769, Dec. 12, 1991, Pat. No. 5,216,043.

[51] Int. Cl.$^6$ .......................... B32B 27/32; B29C 47/88; C08K 5/56

[52] U.S. Cl. ......................... 428/36.6; 428/500; 428/35.2; 428/515; 428/35.4; 428/36.91; 264/211.13; 264/211.14; 264/216; 264/178 R; 522/120; 522/113; 523/126; 523/125

[58] Field of Search .................................. 428/35.7, 500, 428/515, 35.2, 35.4, 36.6, 36.91; 522/116, 113, 120, 109; 525/283, 240, 279, 198, 296, 301; 523/126, 125; 264/211.13, 211.14, 216, 178 R

[56] References Cited

U.S. PATENT DOCUMENTS

| | | | |
|---|---|---|---|
| 3,647,111 | 3/1972 | Stager et al. | 220/83 |
| 3,797,690 | 3/1974 | Taylor et al. | 220/1 R |
| 3,840,512 | 10/1974 | Brackman | 260/94.9 GC |
| 3,864,293 | 2/1975 | Miyoshi et al. | 260/23.7 R |
| 3,867,324 | 3/1975 | Clendinning et al. | 260/23 |

(List continued on next page.)

FOREIGN PATENT DOCUMENTS

| | | |
|---|---|---|
| 0301676A2 | 2/1989 | European Pat. Off. . |
| 0405793A2 | 1/1991 | European Pat. Off. . |
| 0454104A1 | 10/1991 | European Pat. Off. . |
| 2243327A | 10/1991 | United Kingdom . |
| WO88/09354 | 12/1988 | WIPO . |

OTHER PUBLICATIONS

Natta, G., et al., "Structure and Properties of Isotactic Polypropylene," Del Nuovo Cimento, Suppl. A1, vol. XV, Series X, No. 1, 1960, pp. 40–51.

Staff Report, "Proposed Dioxins Control Measure for Medical Waste Incinerators," State of California, Air Resources Board, Stationary Source Division, pp. 1–40, May 25, 1990.

Medical Waste Policy Committee, "Perspective on Medical Waste," A Report of the Nelson A. Rockefeller Institute of Government, State University of New York, pp. II–20–II–24, Jun. 1989.

(List continued on next page.)

Primary Examiner—Charles R. Nold
Attorney, Agent, or Firm—Gary L. Griswold; Walter N. Kirn; F. Andrew Ubel

[57] ABSTRACT

The invention provides a compostable thermoplastic polymer composition comprising a thermoplastic polymer, a transition metal salt selected from cobalt, manganese, copper, cerium, vanadium and iron, and a fatty acid or ester having 10 to 22 carbon atoms providing unsaturated species and free acid. The composition will oxidatively degrade to an embrittled state within at least 14 days at 60° C. and a relative humidity of at least eighty percent. The invention also provides degradable multilayered polyolefin structures incorporating a transition metal in the form of a salt, degradable and compostable multilayered barrier films, degradable, radiation-resistant compositions and articles, and methods of forming and using such compositions, structures and articles.

55 Claims, 4 Drawing Sheets

U.S. PATENT DOCUMENTS

| | | | |
|---|---|---|---|
| 3,901,838 | 8/1975 | Clendinning et al. | 260/23 |
| 3,921,333 | 11/1975 | Clendinning et al. | 47/37 |
| 3,941,759 | 3/1976 | Taylor et al. | 260/92.8 A |
| 4,016,117 | 4/1977 | Griffin | 260/17.4 ST |
| 4,038,228 | 7/1977 | Taylor | 260/23 |
| 4,067,836 | 1/1978 | Potts et al. | 260/23 |
| 4,101,720 | 7/1978 | Taylor et al. | 526/3 |
| 4,324,709 | 4/1982 | Griffin | 523/210 |
| 4,420,576 | 12/1983 | Griffin | 524/47 |
| 4,931,230 | 6/1990 | Krueger et al. | 264/6 |
| 4,931,488 | 6/1990 | Chiquet | 523/126 |
| 4,950,549 | 8/1990 | Rolando et al. | 428/500 |
| 4,964,857 | 10/1990 | Osborn | 604/395 |
| 5,009,648 | 4/1991 | Aronoff et al. | 604/332 |
| 5,059,642 | 10/1991 | Jane et al. | 524/52 |
| 5,108,807 | 4/1992 | Tucker | 428/35.2 |
| 5,135,966 | 8/1992 | Chatterjee et al. | 523/126 |
| 5,140,073 | 8/1992 | Rolando et al. | 525/240 |
| 5,216,043 | 6/1993 | Sipinen | 523/126 |

OTHER PUBLICATIONS

Allwood, M. C., "The release of phthallate ester plasticizer from intravenous administration sets into fat emulsion," *29 International Journal of Pharmacology,* 233–236 (1986).

Miller, R. L., "On the Existence of Near–range Order in Isotactic Polypropylenes," *Polymer,* vol. 1, No. 2, pp. 135–143 (Jun. 1960).

Recomp of Minnesota, "Recomp Fact Sheet."

Prince, J., "Large–Scale Compositing Offers Promise, Not Panacea," Environmental Defense Fund Newsletter, p. 7, Sep. 1991.

Epstein, E., et al., "Public Health Issues and Composting," *Biocycle,* vol. 30, No. 8, p. 50, Aug. 1989.

Goldstein, G., "Designed to Break Down," *Mechanical Engineering,* pp. 52–63, Jul. 1990.

McCarthy, L., "Degradable plastics fit best in specialty areas," *Plastics World,* pp. 29–35 *Sep. 1989.*

Program, INDA's Disposability & Waste Management Conference, Sep. 24–25, 1991.

DEGRADABLE MULTILAYERED STRUCTURES

RELATED APPLICATIONS

This application is a continuation-in-part of pending U.S. patent application Ser. No. 07/806,769, filed Dec. 12, 1991, the entire contents of which are expressly incorporated by reference herein.

FIELD OF THE INVENTION

This invention relates to a novel polymeric blend having enhanced environmental degradability properties comprising a non-biodegradable thermoplastic polymer. This invention also relates to multilayered structures of non-biodegradable thermoplastic polymers that are environmentally degradable, to degradable radiation-resistant compositions and articles, and to methods of forming and using such structures, compositions and articles.

BACKGROUND OF THE INVENTION

There are numerous patents dealing with enhancing the degradability of conventional non-biodegradable polymers such as polyolefins by use of additive systems. These additive systems are quite frequently designed to enhance the polymers degradability in a specific type of environment and over a specific length of time. For example, U.S. Pat. No. 3,840,512 (Brackman) exemplifies prodegradant systems comprising ferric stearate with various free fatty acids, both saturated and unsaturated. Manganese stearate is also exemplified in a system with stearic acid. Brackman states that thermoplastic films (e.g., polyolefin films) formed with these prodegradant systems will embrittle when exposed to artificially UV-activated irradiation at times ranging from 2 to 35 days. It is specifically stated that the nature of the hydrocarbon group on the fatty acid does not have a large influence on the rate of UV degradation. Brackman does not address the issue of degradability in other environments, such as in a compost environment. A patent dealing with a similar prodegradant system, U.S. Pat. No. 4,067,836 (Potts et al.), discloses adding a transition metal salt, an auto-oxidative susceptible additive, and an anti-oxidant to polyethylene. The only exemplified auto-oxidative susceptible additives were polypropylene and polyethylene oxide (which did not work as acceptably as polypropylene). The degradation of the samples was tested by exposure to an artificial solar light spectral distribution. The degradability characteristics of these prodegradant additives were never demonstrated in other environments such as a compost environment. Generally, additive systems as described above, designed to make a polymer degrade when exposed to environmental radiation, have proved of doubtful practical utility. Only a relatively small portion of the waste stream is ever exposed to sunlight, even for short periods of time.

In U.S. Pat. No. 3,921,333 (Clendinning, et al.) it is proposed to make the composition of Potts, et al., discussed above, degradable in a soil type environment by adding a biodegradable polymer such as poly(caprolactone). The invention described is allegedly useful for materials such as transplanting containers, mulch film and the like. Again, only a small portion of the plastic in the waste stream is ever used in such environments and as such the compositions described are of limited applicability based on their limited intended use.

U.S. Pat. No. 4,038,228 (Taylor, et al.) describes placing a transition metal salt of an unsaturated organic acid or ester into a polymer film (e.g., polyethylene or polypropylene) to enhance its degradability in the absence of sunlight. The transition metal salts discussed are identical to many of those exemplified in the above Clendinning et al. and Potts et al. patents; however, they are exemplified at extremely high concentrations. The exemplified film degrades to an embrittled condition within three days at room temperature. Such a film is of doubtful utility as it would likely degrade before use and the exemplified high concentrations of cobalt used would create an extremely costly and toxic material.

A more recent patent, U.S. Pat. No. 4,931,488 (Chiquet), describes a polymer (e.g., polyethylene) composition which allegedly will degrade when exposed to heat, ultraviolet radiation, sunlight, or under composting conditions. The prodegradant system broadly described consists of a biodegradable substance such as starch, an iron compound and a fatty acid or fatty acid ester, optionally with copper stearate. The exemplified films, however, are limited to polyethylene blended with ferric stearate and soya oil, with a minor proportion of cupric stearate in certain examples. Although it is alleged that these compositions are tested under composting conditions, the conditions are not actually set forth and the reported films do not appear to degrade for up to twenty weeks, a situation which would be unacceptable in most commercial composting situations where peak temperatures are reached for only approximately two weeks.

As can be seen the art continues to seek to improve the degradability of conventional plastic films in various environments by use of additive prodegradant systems. These systems have been designed to provide degradability properties in a wide variety of environmental conditions. Systems that have been found to work in one list of conditions do not necessarily work under a separate set of conditions which can vary from a dry sunlit exposure to the wet, dark, and relatively infertile conditions of a composter.

Several patents have also dealt with the degradability of multilayered structures formed from various polymers. For example, U.S. Pat. No. 3,647,111 (Stager et al.) discloses a biodegradable container formed from a core layer of an organic filler material, such as peat, and a phenolic resin impregnated with a metallic salt of a fatty acid. This core layer is laminated with an outer protective coating, such as a water-soluble paint, and an inner protective coating, such as a thin plastic liner, a metal flash, or a very thin layer of wax. Allegedly, the extremely thin inner layer, which performs no significant structural function, will break down under normal atmospheric conditions.

U.S. Pat. No. 5,009,648 (Aronoff et al.) discloses biodegradable films comprising starch blended with a polymeric material, such as ethylene vinyl acetate, as well as ostomy pouches formed from such films. Supposedly, these films and pouches will degrade when deposited in a landfill or compost heap after transit through a municipal sewage system and collection at a sewage treatment plant.

Furthermore, U.S. Pat. No. 5,108,807 (Tucker) discloses degradable multilayer thermoplastic articles comprised of a water-soluble and/or biodegradable core layer surrounded by two opposing layers of thermoplastic polymers containing an effective amount of a prodegradant, such that these layers will degrade by photo, thermal, or chemical means. Such articles are disclosed to be useful in the construction of bags formed from multilayered films.

In a different aspect, considerable research has been conducted regarding the formation of radiation resistant polymeric compositions and structures. In this regard, attempts have been made to overcome degradation problems associated with crystalline polypropylene. For example, mesomorphous polypropylene, as described in U.S. Pat. No. 4,931,230, and articles manufactured from mesomorphous polypropylene, such as described in U.S. Pat. No. 4,950,549, provide resistance to sterilizing irradiation. In addition, polymer blends of mesomorphous polypropylene and a polymer compatible with such polypropylene, as described in U.S. Pat. No. 5,140,073, have been developed. By controlling the method of preparing mesomorphous polypropylene, through the quenching of such polypropylene after hot-melt extrusion, the material or articles formed therefrom substantially maintain their structural integrity after exposure to ionizing radiation at dosages sufficient to degrade crystalline polypropylene.

Applicants have found a composition which will rapidly degrade under conditions of a typical commercial composting unit yet provide an article such as a film which is functional under normal use conditions. A typical composting unit generally is exposed to peak temperatures of greater than 60° C. for periods of approximately two weeks or less. During that period, the organic matter in the composter is generally exposed to an extremely high humidity, generally close to one hundred percent. These humidity conditions are generally favorable for biological attack, however, they are generally inhospitable to oxidative type degradations where transition metal salts are typically employed.

In addition, Applicants have also discovered various multilayer polyolefin structures that will degrade under a variety of conditions, including the commercial composting conditions described above. Surprisingly, such degradation will occur when one or more of the polyolefin layers is lacking in a prodegradant system. Also, such degradation can surprisingly be accomplished with compositions, articles, and structures formed from radiation resistant, mesomorphous polypropylene.

BRIEF SUMMARY OF THE INVENTION

The present invention provides a degradable composition comprising a thermoplastic polymer, a transition metal salt selected from salts of cobalt, manganese, copper, cerium, vanadium and iron, and a fatty acid or ester having ten to twenty-two carbon atoms comprised predominantly of unsaturated species and comprised at least partially of free acid. The composition is designed so that it will oxidatively degrade to form an embrittled polymer within at least fourteen days at 60° C. and at a relative humidity of at least eighty percent. After this peak period, the temperature of a typical compost unit slowly declines, decreasing the rate of oxidative degradation, often quite dramatically.

The present invention also provides degradable multilayered polyolefin structures wherein the first layer contains a prodegradant system comprised of transition metal salts, and the second layer that does not contain the prodegradant system. In addition, the present invention provides degradable and compostable multilayered barrier films, a degradable, radiation resistant composition, articles formed from such compositions, films and structures, as well as methods for containing a perishable material with a degradable packaging film, methods of forming a degradable, radiation-resistant article, and methods of using a degradable multilayered barrier film. All of the multilayered materials of the present invention will oxidatively degrade to embrittlement at a temperature of about 49° C. over a period of at least about fourteen days. In addition, most of these same materials will also oxidatively degrade to form an embrittled multilayered structure within at least about fourteen days at 60° C. and at a relative humidity of at least eighty percent.

DEFINITIONS

For the purposes of this invention the definition of "polymer" includes a homopolymer, a copolymer, or an oligomer, as well as any mixtures or blends of one or more homopolymers, and/or one or more copolymers, and/or one or more oligomers.

The term "copolymer" refers to a polymeric material produced by the polymerization of two or more dissimilar monomers, either with or without another functional group, such as maleic anhydride, grafted thereto, as well as to a homopolymer with a functional group grafted thereto. Thus, the term "copolymer" includes, without limitation, random copolymers, block copolymers, sequential copolymers, and graft copolymers.

"Propylene-based material" refers to propylene monomer, or polypropylene polymer.

The term "moiety" refers to any substance which can be combined with a propylene-based material to forms copolymer, and includes, without limitation, a monomer, a polymer, or a molecule.

"Mesophase propylene-based material", refers to a propylene-based material, in the ordered, mesophase form, which is neither amorphous, nor so ordered as to constitute the isotactic I crystalline form (e.g., crystalline polypropylene) as described by G. Natta et al., "Structure and Properties of Isotactic Polypropylene", *Del Nuovo Cimento,* Suppl. A1, Vol. XV, Serie X, No. 1, 1960, pp. 40–51, the disclosure of which is herein incorporated by reference. A mesophase propylene-based material is formed by quenching a propylene-based material from the melt state, as defined below, and includes, without limitation, mesomorphous polypropylene, mesopolymer blends, and/or mesocopolymers, as those terms are defined below.

"Quenching", refers the process of immediately and rapidly cooling propylene-based material from the melt state such that mesophase propylene-based material is obtained.

As used herein, "a non-chlorine containing organic polymer which is substantially impermeable to oxygen gas" refers to polymeric materials which are essentially free from chlorine, and which have oxygen transmission rates of less than about 150 cc/m$^2$/day-atmosphere at 25° C. and 0% relative humidity.

"Olefin polymers" or "polyolefins", refers to polymers of the unsaturated hydrocarbons of the general formula $C_nH_{2n}$, including copolymers of olefins with other monomers such as ethylene with vinyl acetate.

"Mesomorphous polypropylene" (mPP) refers to the polypropylene homopolymer in the mesophase form.

The term "mesopolymer blend" refers to a mixture of mesomorphous polypropylene with at least one additional polymer (hereinafter a "second polymer").

The term "mesocopolymer" refers to a copolymer of a propylene-based material an, a discernable amount of at least one moiety that is quenched from the melt state to form a copolymer in the mesophase form.

"Transition metal salt" means any compound or composition containing a transition metal ion and at least one other element. As used herein, a transition metal includes elements 21 through 30, 39 through 48, 57 through 80 and 89 through 103 of the Periodic Table, all of which have a partially filled outer shell of electrons.

The terms "degradable", "oxidatively degradable", or "oxidative degradation" refer to the breakdown of thermoplastic polymers, such as polyolefinpolymers, to lesser molecular weight components through oxidative chain scission facilitated by a prodegradant system, as that term is defined below. The oxidative degradation of a thermoplastic polymer also leads to changes in the physical properties of the polymer, such as loss of tensile strength and embrittlement, as that term is defined below. Generally, a multilayered structure according to the present invention is considered to be degradable if it becomes embrittled in the presence of the prodegradant system, when maintained at a temperature of about 49° C. over a period of approximately fourteen days or less.

"Compostable" refers to the oxidative degradation of thermoplastic polymers in the warm and moist environment of a municipal or commercial composting facility. In general to be considered compostable, a polymeric composition or multilayered structure according to the present invention should degrade to embrittlement, as defined below, within at least about fourteen days at 60° C. and at a relative humidity of at least about 80 percent. For the purposes of testing the compositions and structures of the present invention, commercial composting conditions were simulated by placing single and multilayered films into a Jar of water which was then buffered to a pH of 6 by a phosphate buffer and heated to various temperatures.

A "prodegradant system" means any composition of at least one transition metal salt that facilitates the oxidative degradation of a thermoplastic polymers, such as a polyolefin polymer. The prodegradant system may also optionally include an auto-oxidative component, as that term is defined below. When used to form a compostable thermoplastic polymer or structure, the prodegradant system will include such an auto-oxidative component.

An "auto-oxidative component" means any substance, compound or composition, which in combination with the transition metal salt of the prodegradant system, enhances the oxidative degradation of a thermoplastic polymer, such that the polymer is broken down at a faster rate than if it was contacted with the transition metal salt alone. When used to form a compostable polymer and/or structure, the auto-oxidative component includes a fatty acid or ester having ten to twenty-two carbon atoms comprised predominantly of unsaturated species and comprised at least partially of free acid.

As used herein, "embrittlement" means the point at which samples of thermoplastic polymers maintained in heated oven or a simulated composting environment either crumble upon folding or creasing, or have little or no tear strength remaining. The "time to embrittlement" is the total elapsed time from the placement of the samples of degradable polymers in the oven or simulated composting environment to the point of embrittlement of the samples.

A "naturally biodegradable polymer" refers to any polymer that is susceptible to breakdown to lesser molecular weight components through the action of living organisms, such as bacteria, fungi, and algae.

BRIEF DESCRIPTION OF THE DRAWINGS

The invention may be further illustrated by reference to the accompanying Drawings wherein.

DETAILED DESCRIPTION OF EMBODIMENTS OF THE INVENTION

I. Compostable Composition and films

Figure 1:
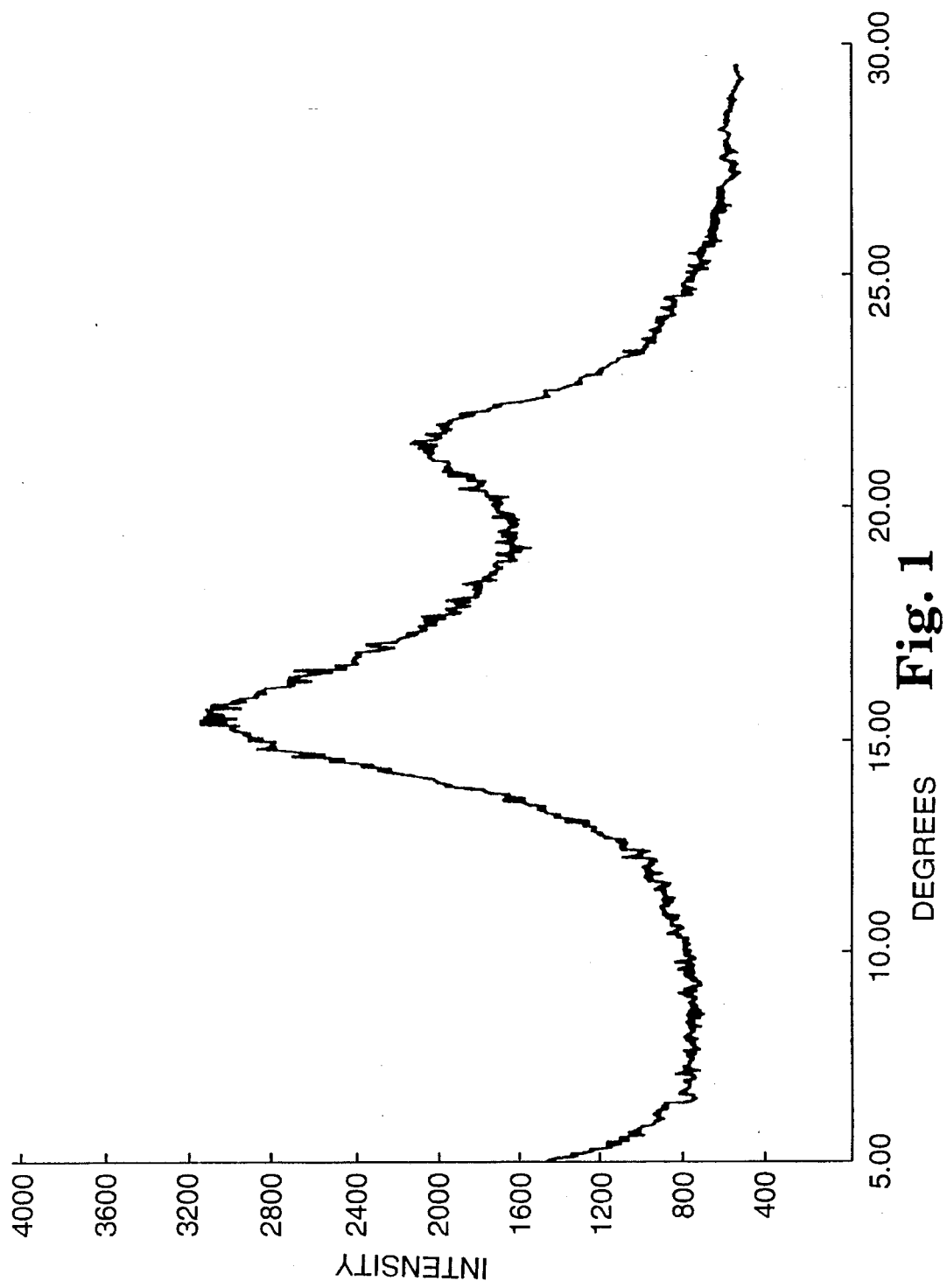
FIG. 1 is the wide-angle x-ray diffraction pattern of the film of Example 152, showing mesomorphous polypropylene containing the prodegradant system of the present invention.
Figure 2:
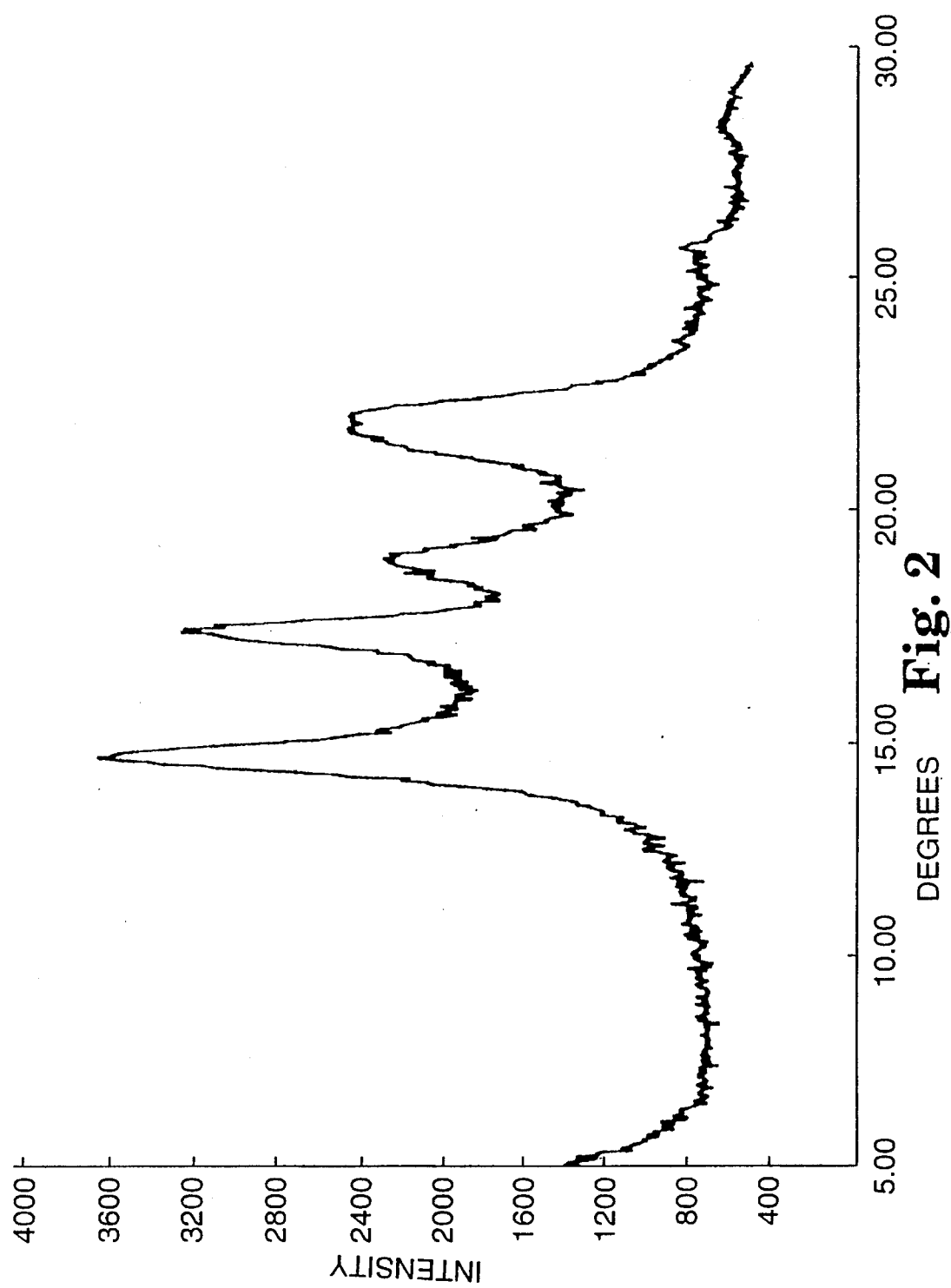
FIG. 2 is the wide-angle x-ray diffraction pattern of the film of Comparative Example 154, showing crystalline polypropylene containing the prodegradant system of the present invention

In a first embodiment, the invention is generally directed to a compostable thermoplastic polymer composition comprising a thermoplastic polymer containing a prodegradant system of an auto-oxidant of an unsaturated fatty acid or ester having ten to twenty-two carbon atoms, and certain transition metal salts.

The fatty acid or ester is present in the polymer composition at a concentration of about 0.1 to 10 weight percent so as to provide a concentration of unsaturated species of greater than 0.1 weight percent and a concentration of free acid species greater than 0.1 percent by weight based on the total composition. Further included is a transition metal salt at a relatively low concentration of 5 to 500 ppm of the metal itself where the transition metal is selected from the group comprising cobalt, manganese, copper, cerium, vanadium and iron, preferably cobalt, manganese, copper or cerium. The composition is formulated such that it will oxidatively degrade, preferably to an embrittled state, within fourteen days at a temperature of about 60° C. and relative humidity of 80 percent or more, preferably 100 percent after a reasonable shelf life. Generally, it is expected that the composition will have to be shelf-stable for a time ranging from one week to 12 months. As the degradation occurs slowly, even at room temperature, for longer shelf-life products, generally lower concentrations of the transition metal or fatty acid (free acid and/or unsaturated species) will be required to provide a compostable film at the film's intended mean shelf life. Conversely, higher concentrations of the metal or fatty acid species will be required for films with short-intended shelf lives.

Thermoplastic polymers suitable for use with the present prodegradant system include polyolefins such as polyethylene, polypropylene, polybutylene or poly(4-methyl-1-pentene). Other suitable polymers include poly(vinyl acetates), polyesters, polyurethanes, poly(vinyl alcohols), polyamides, polystyrenes or polyamines. Copolymers and blends are also suitable. Preferably, the polymer employed is a saturated thermoplastic polymer such as polyethylene or polypropylene suitable for extrusion or coextrusion. Most preferred are polypropylenes or polypropylene blends, such as blends of polypropylene and polyethylene-based polymers and copolymers.

The transition metal salts include those discussed, for example, in U.S. Pat. No. . 4,067,836, which salts can be ones having organic or inorganic ligands. Suitable inorganic ligands include chlorides, nitrates, sulfates, and the like. Preferred are organic ligands such as octanoates, acetates, stearates, oleates, naphthenates, linoleates, tallates and the like. Although a wide range of transition metals have been disclosed in the art as suitable for various prodegradant systems, for a compostable polymeric film it has been found that the transition metal must be selected from the group comprising cobalt, manganese, copper, cerium, vanadium and iron in a concentration range of from 5 to 500 ppm and preferably cobalt, manganese, copper and cerium for most polymers. Preferably, the transition metal is used in a concentration of from 5 to 200 ppm which is highly desirable as such metals are generally undesirable in large concentrations. High transition metal concentrations in compost material can lead to toxicological and environmental concerns due to groundwater leaching of these metals into the surrounding environment. Further, higher transition metal concentrations can yield unstable films with the invention prodegradant system.

Oxidative degradation in a typical composter occurs under substantially saturated atmospheric humidity conditions. The plastic on its external face will normally see a humidity of approximately 100 percent. These are extremely severe conditions for oxidative degradation and it has been found that the prodegradant systems described in the art are not suitable for adequate degradation of plastics under these conditions.

It is found that adequate degradation under typical composting conditions requires salts of the above mentioned transition metals in combination with acid moieties such as those found in unsaturated fatty acids. It has also been found that unsaturation in the fatty acid, or an admixed fatty acid ester or natural oil, is required to produce adequate degradation with the proper transition metal compound. Preferably, this unsaturated fatty acid is present in the polymer composition at concentrations of at least 0.1 weight percent of the composition, preferably at least 0.25 weight percent, and most preferably at least 0.5 weight percent. Also suitable are blends of fatty acids and fatty acid esters or oils as long as the amount of free acid and unsaturated speckles are generally equivalent to the above described ranges for a pure fatty acid containing composition.

Generally, it has been found that unsaturated fatty acids having 10 to 22 carbon atoms function well in providing the degradation rate required for a compostable material. Unsaturation such as found in abnormal oils is found to be preferred. Such unsaturation includes two or more double bonds in the fatty acid or ester chains. Generally, unsaturation where two of the double bonds are separated by two single bonds, resulting in a doubly allelic carbon atom, has been found to be highly desirable, although conjugated double bonds are also preferred. Samples of materials which contain doubly allelic carbon atoms include linseed oil, linoleic acid and linolenic acid. An example of a common conjugated fatty acid is eleostearic acid found in high concentration, in the ester form, in natural tung oil. Other natural oils containing fairly high amounts of unsaturation include fish oils such as sardine, cod liver, menhaden, and herring oil. Fatty acids derived from these naturally occurring oils containing high percentages of unsaturation are also suitable as auto-oxidative accelerating components.

Also suitable are fatty acid derivatives, substituted fatty acids or derivatives or corresponding reduction products such as amines or alcohols and the like, although substitutions should not be adjacent to allelic or conjugated double bonds or other sources of unsaturation as they tend to reduce the effectiveness of such fatty acids and derivatives. Generally, other acids have been found to be unsuitable, including dicarboxylic fatty acids. However, additive amounts of rosin acids such as Foral™ AX have been found to be useful in some instances.

Preferably, the composition further includes an anti-oxidant. Anti-oxidants help stabilize the polymer during extrusion operations during the formation of a film or other article as well as help provide a suitable shelf life for the degradable articles. Any suitable anti-oxidants used with the conventional base polymer are acceptable including such typical anti-oxidants such as sterically hindered phenols, aryl amines, thioureas, thiocarbamates, thioesteresters, phosphites, or the like. Illustrative anti-oxidants can be found, for example, in U.S. Pat. No. 4,067,836. Preferably the anti-oxidant is present in a concentration of approximately 0.1 weight percent or more based on the total polymer composition.

The compostable polymer composition also preferably includes a naturally biodegradable polymer such as poly(caprolactone), poly(lactic acid), poly(hydroxybutyrate-valerate), poly(ethylene adipate), poly(vinyl alcohol), modified starch/oleofin copolymers, poly(propylene oxide), and poly(ethylene oxide). Other suitable biodegradable polymers are generally well known and are described in, for example, U.S. Pat. No. 3,921,333. These biodegradable polymers assist in further biodegradation of the composition following the transition metal salt catalyzed oxidative degradation, which reduces the base thermoplastic resin to a lower molecular weight substance. Although these biodegradable polymers alone can be broken down fairly rapidly in any compost type environment, their physical properties are generally inferior to those of conventional thermoplastic films. Further, their costs are often quite prohibitive for use in typical commercial applications. However, blended with conventional thermoplastic materials, such as polyolefins, these biodegradable polymers should assist in the biological breakdown of the articles following the catalytic embrittlement period. Generally, the naturally biodegradable polymer can be included in amounts from 5 to 50 weight percent of the composition, preferably these biodegradable polymers are used at from 5 to 25 weight percent.

Other conventional additives can be added to the polymer composition including fillers, dyes, pigments, anti-blocking agents or the like.

The invention composition finds particularly advantageous use for producing films or fibers due to the composition's ability to be extruded without significantly affecting performance. With such extruded films or fibers, the fatty acid species preferably are predominantly $C_{12}$ to $C_{22}$ species. These fatty acid species are generally more tolerant of typical extrusion conditions. However, the composition can be used in other extruded articles or non-extruded articles.

Typical uses for the composition as extruded films or fibers include disposable items which would in use be at ambient conditions or below, or exposed to elevated temperatures for a relatively short period of time. This would include trash bags, disposable diaper components (e.g., diaper backsheets, polymer film components, extruded non-woven fiber webs, and the like), freezer bags, disposable medical bags or components, disposable garments, hygiene articles, internal packaging films, etc.

II. Degradable Compositions and Articles, Multilayered Structures Methods of Formation and Use In a second embodiment, the invention is directed to degradable compositions, articles, and structures, including compostable materials, comprising polyolefin polymers containing a prodegradant system of transition metal salts. The transition metal salt of the prodegradant system can be any of those defined herein. Preferably, the transition metal salt comprises the same salts disclosed in Section I. above, such as the organic ligand salts of cobalt, manganese, copper, cerium, vanadium, and iron. To facilitate the desired degradation, these transition metals are employed in one or more polyolefin layers at concentrations of from about 5 parts per million (ppm) to about 2000 ppm, more preferably at concentrations ranging from about 25 ppm to about 500 ppm. When the transition metals are utilized at concentrations of greater than 500 ppm, an anti-oxidant may be required to maintain an acceptable shelf-life for the resulting product. However, as noted above, the concentrations of these metal salts should preferably be minimized to avoid toxicological and environmental concerns, and to help ensure acceptable shelf stability for the degradable compositions, structures and articles of the present invention.

The prodegradant system may optionally include an auto-oxidative component, as described in Section I. above. As in the compostable compositions and films of Section I. of this application, the auto-oxidative component comprises acid moieties such as those found in unsaturated fatty acids or esters. Preferably such fatty acids or esters will have from 10 to 22 carbon atoms.

When forming a compostable multilayered structure, including multilayered barrier and packaging films according to the present invention, the prodegradant system will comprise the combination of transition metal salts and auto-oxidative components, including the preferred amounts and components disclosed in Section I. of this application. Thus, unsaturated fatty acids having from 10 to 22 carbon atoms, such as oleic acid, linoleic acid, and linolenic acid, as well as natural oils and fatty acid derivatives, such as linseed oil, tung oil, sardine oil, cod liver oil, and herring oil, comprise desirable auto-oxidative components of the prodegradant system of the present invention. As noted above, these unsaturated fatty acids or derivatives are preferably present in one or more polyolefin layers at concentrations of at least 0.1 weight percent to about 10 weight percent of the composition of that layer, preferably from about 0.25 weight percent to about 3 weight percent, and most preferably from about 0.5 weight percent to about 2 weight percent.

The polyolefin polymers employed in the compositions, structures and articles of the present invention can include any polyolefins which when combined with the prodegradant system of the present invention will oxidatively degrade, and/or compost in a suitable environment, ale those terms are defined herein. Nonlimiting examples of suitable polyolefin polymers include polypropylene, polybutylene, polyethylene, low density polyethylene (LDPE), linear low density polyethylene (LLDPE), high density polyethylene (HDPE), ethylene vinyl acetate copolymer (EVA), and ethylene acrylic acid copolymer (EAA). Preferred polyolefin polymers for use in the degradable compositions, structures and articles of the present invention include polypropylene, polyethylene, and polybutylene, with polypropylene and polyethylene being particularly preferred.

In a preferred aspect, the polyolefin polymer of the degradable compositions, structures, and articles of the present invention comprises a mesophase propylene-based material, such as mesomorphous polypropylene, mesopolymer blends, and/or mesocopolymers. See, copending and co-filed U.S. patent Ser. Nos. 07/967,837 (Rolando et al.), abandoned 07/968,037 (Wilfong et al.) abandoned, 07/810001 (Wilfong et al.), abandoned, and U.S. Pat. No. 5,140,073, the disclosures of which are herein incorporated by reference. Even after being exposed to a dose of radiation of from about 1 kGy (0.10 Mrad) to about 200 kGy (20.0 Mrad), these mesophase propylene-based materials degrade at substantially slower rates than comparable crystalline propylene-based materials. Unexpectedly, degradable compositions, structures, and articles formed from mesophase propylene-based materials oxidatively degrade at comparable rates to crystalline propylene-based materials when combined with the prodegradant system of the present invention.

For example, the polyolefin polymer used in the degradable materials of the present invention may comprise mesomorphous polypropylene homopolymer, or polymer blends of mesomorphous polypropylene and a second polymer, that exhibit increased resistance to the degrading effects of ionizing radiation, including gamma and electron-beam radiation, as described in U.S. Pat. No. 5,140,073. Nonlimiting examples of suitable second polymers include polybutylene, atactic polypropylene, polypropylene-ethylene copolymers, EVA, EAA, poly(4-methyl pentene), and polyethylene, including polyethylene copolymers, LDPE, LLDPE, and HDPE. Furthermore, these mesopolymer blends may exhibit other desirable properties attributable to the second polymers, such as increased toughness, heat sealability, softness, and quietness, depending upon the particular second polymer combined in the mesopolymer blend.

As noted above, the polyolefin component of the degradable compositions, structures, and articles can also comprise a mesocopolymer. In this regard, any moiety, or combination of moieties, can be used in conjunction with a propylene-based material to form the mesocopolymers used in the materials of the present invention. For example, the propylene-based material can comprise propylene monomer and the moiety of a different monomer other than propylene, such as ethylene or butylene, that when polymerized, melt extruded, and quenched, form a mesocopolymer.

The mesocopolymers usable in the degradable materials of the present invention generally fall within three classes. The first class of copolymer comprises a mesocopolymer wherein the other moiety comprises a monomer, such as ethylene or butylene, that is inserted between propylene monomers in a copolymer chain (e.g., Petrothane™ resin No. PP7300-KF (Quantum Chemical, Inc.)). The second class of mesocopolymers comprise mesocopolymers of the above described class one copolymers, with another moiety grafted to the copolymer chain (e.g., Plexar™ resin No. 420 (Quantum Chemical, Inc.)). The third, and final, general class of mesocopolymers comprise a mesomorphous polypropylene homopolymer with a moiety, such as maleic anhydride or acrylic acid, grafted to the polymer chain (e.g., Admer™ resin No. QF551A (Mitsui Plastics, Inc.)).

The combination of a mesophase propylene-based material with the prodegradant system provides a unique composition according to the present invention.. As described above, mesophase propylene-based materials, such as mesomorphous polypropylene, mesopolymer blends, or mesocopolymers, formed by quenching propylene-based materials from the melt state, are significantly more resistant to degradation by ionizing radiation than a comparable material or structure formed from a crystalline propylene-based material. See also U.S. Pat. Nos. 4,931,230, 4,950,549, and 5,140,073, and U.S. patent applications Ser. Nos. 07/967, 837 abandoned and 07/968,037, abandoned. Surprisingly, these degradation resistant, mesophase propylene-based materials oxidatively degrade and/or compost when combined with the prodegradant system of the present invention. Even more surprisingly, these degradation resistant materials degrade and/or compost at essentially the same rates as comparable crystalline propylene-based materials. Furthermore, such degradation and/or composting functions equally well for mesophase propylene-based materials lacking the prodegradant system that are layered or in contact with another polyolefin layer containing the prodegradant system of the present invention.

The degradable, radiation resistant composition of a mesophase propylene-based material with the prodegradant system can be formed via melt extrusion, followed by quenching, into a number of useful articles, such as films, fibers, tubes, and microfibers. These articles can in turn be manufactured into, or be used as a component part of, additional useful structures, such as tapes, multilayered barrier and packaging films, a transdermal drug delivery patch, or an ostomy pouch.

The degradable compositions, structures, and articles of the present invention may also optionally contain additional conventional additives, including fillers, dyes, pigments, anti-blocking agents, plasticizers, and the like, as described in Section I. of this application. Of these additives, it is often preferable that these degradable materials include an anti-oxidant to help stabilize the structures or articles, particularly with respect to shelf life. Preferred anti-oxidants include those described above in Section I. of this application.

Furthermore, the degradable materials of the present invention may also include naturally biodegradablepolymers, such as poly(caprolactone) and poly(lactic acid), as described in Section I. above. These naturally biodegradable polymers can either be blended with the degradable compositions into one or more of the layers of the structures of the present invention, or can be included as one or more separate and distinct layers in a multilayered construction. When used as the gas barrier layer of degradable and compostable barrier films according to the present invention, the naturally biodegradable polymers will typically comprise ethylene vinyl alcohol copolymer (EVOH) and/or polyvinyl alcohol (PVOH).

In their most basic form, the degradable multilayered structures of the present invention comprise a first polyolefin layer containing the prodegradant system contacting a second polyolefin layer without the prodegradant system. However, it is within the scope of the present invention to provide a degradable and/or compostable structure of virtually any combination or one or more polyolefin layers with the prodegradant system with one or more layers without the prodegradant system. Thus, a structure of a polyolefin layer containing the prodegradant system sandwiched between two polyolefin layers lacking the prodegradant system, as well as other structures, is within the present invention. As long as such structures degrade and/or compost within the conditions described herein, they are considered to fall within the present invention.

The polyolefins utilized in these multilayered structures can comprise the same polyolefin in all layers, or different polyolefins, including blends and copolymers, in various layers. In addition, some or all of the layers can be comprised of mesophase propylene-based materials such as mesomorphous polypropylene, mesopolymer blends, and/or mesocopolymers. Furthermore, naturally biodegradable polymers can be blended into one or more layers, and/or appear as separate and distinct layers of these degradable multilayered structures.

The thickness of the various layers of these multilayered structures can be widely varied, and still provide a degradable and/or compostable Structure according to the present invention. In this regard, the ratio of the thickness of a layer containing the prodegradant system to the thickness of a layer without the prodegradant system can be from about 1:10 to about 1000:1, more preferably from about 1:2 to about 100:1, and most preferably from about 1:1 to about 10:1.

In a preferred embodiment, the degradable multilayered structure according to the present invention comprises a degradable multilayered barrier film of a gas barrier layer of a chlorine-free, naturally biodegradable polymer and one or more moisture barrier layers of mesophase propylene-based materials containing the prodegradant system of the present invention. In this regard, any mesophase propylene-based material, such as mesomorphous polypropylene, mesopolymer blends, mesocopolymers, or combinations thereof, can serve as moisture barrier layers that protect the gas barrier layer from moisture that would reduce or eliminate its gas and odor impeding properties.

For example, the degradable barrier film may be comprised of a layer of a chlorine-free, naturally biodegradable copolymer, such as EVOH, contacted on opposing sides by moisture barrier layers of mesomorphous polypropylene containing the prodegradant system of the present invention. In addition, such a structure may also contain optional adhesive layers, such as an Admer™ adhesive resin in a mesophase form, interposed between the gas barrier layer and moisture barrier layers to provide additional structural integrity to the overall barrier film. However, it will be appreciated that any degradable multilayered barrier structure with two or more layers, which includes at least one gas barrier layer, and at least one moisture barrier layer, is considered to be within the present invention.

The gas barrier layer of the degradable multilayered barrier film is comprised of a chlorine-free, naturally biodegradable polymer which is substantially impermeable to oxygen gas. Preferably, the chlorine-free naturally biodegradable polymer exhibits a permeability to oxygen ($O_2$) gas of less than 100 $cc/m^2$/day-atmosphere (hereinafter expressed as "$cc/m^2$/d-atm"), more preferably less than 30 $cc/m^2$/d-atm, and most preferably less than 5 $cc/m^2$/d-atm, where the permeability measurements are taken at 25° C. and zero percent (0%) relative humidity. It will also be appreciated that the $O_2$ permeability measurements are expressed for a multilayered barrier film with a gas barrier layer thickness of 25µ (microns). Accordingly, appropriate adjustment of the permeability values must be made, depending upon the thickness of the gas barrier employed in a structure, as well as the number of gas barrier layers utilized therein. In either case, the values should be normalized to a total gas barrier layer thickness of 25µ. All values were normalized to standard gas barrier layer thickness of 25µ by multiplying the oxygen transmission rate value by the ratio of barrier layer thickness to 25µ. In addition to substantial impermeability to $O_2$ gas, it will further be appreciated that the gas barrier layer also exhibits barrier properties to $CO_2$, $N_2$ and $H_2S$ gases, as well as to other gases and odors.

Nonlimiting examples of suitable chlorine-free, naturally biodegradable polymers in accordance with the present invention include vinyl alcohol containing polymers, such as ethylene vinyl alcohol copolymer (EVOH) and polyvinyl alcohol (PVOH). Preferably, the chlorine-free polymer comprises EVOH. In this regard, the gas barrier layer should preferably be comprised of substantially pure EVOH, most preferably comprising 99% or more EVOH. However, it also within the scope of the present invention to utilize blends of EVOH with other polymers, such as ethylene vinyl acetate copolymer.

In another preferred embodiment, the present invention provides a compostable multilayered barrier film of a gas barrier layer of a chlorine-free, naturally biodegradable polymer and one or more moisture barrier layers of polyolefinpolymers containing the prodegradant system of the present invention. In such an embodiment, the prodegradant system is specifically comprised of from about 5 ppm to about 2000 ppm of a transition metal in the form of a salt, and an auto-oxidative component comprising a fatty acid, substituted fatty acid or derivatives, or blends thereof, having 10 to 22 carbon atoms. This auto-oxidative component comprises between about 0.1 to 10 weight percent based on the total composition of the moisture barrier layer(s), and provides at least 0.1 weight percent of unsaturated species and at least 0.1 weight percent of free acid species in the total composition. The transition metal portion of the salt is selected from the group consisting of cobalt, manganese, copper, cerium, vanadium and iron.

The polyolefinpolymers used in the moisture barrier layer(s) can be any of those disclosed herein, including mesophase propylene-based materials, such as mesomorphous polypropylene, mesopolymer blends, mesocopolymers, or combinations thereof. Furthermore, the chlorine-free, naturally biodegradable polymers of the gas barrier layer comprise the same materials, including the preferred EVOH copolymer described above for the degradable multilayered barrier film.

Importantly, the degradable and compostable multilayered barrier films of the present invention eliminate chlorine-containing compounds as components of the gas barrier layer, moisture barrier layers, optional adhesive layers, or as additives to these layers, and thereby provide environmentally compatible films that can be disposed of, such as through composting, without endangering humans. This is in direct contrast to typical barrier films, using materials such as poly(vinylidene chloride) (PVDC), and poly(vinyl chloride) (PVC), which can present both human and environmental hazards.

In particular, materials such as PVDC and PVC can release hazardous substances, such as hydrochloric acid (HCl), polychlorinated dibenzodioxin, and furan toxins into the environment. See e.g., Staff Report, "Proposed Dioxius Control Measure for Medical Waste Incinerators", State of California, Air Resources Board, Stationary Source Division, pp. 1–40 (May 25, 1990); Medical Waste Policy Committee, "Perspectives on Medical Waste", A Report of the Nelson A. Rockefeller Institute of Government, State University of New York (June, 1989). In addition, exposure to di-2-ethylhexylphthalate (DEHP), a common plasticizer utilized with PVDC and PVC, may present a number of health-related concerns, including reduced blood platelet efficacy, and potential links to liver cancer. See e.g., Allwood, M. C., "The Release of phthalate ester plasticizer from intravenous administration sets into fat emulsion", 6 *International Journal of Pharmacology*, 233–6 (1986). In contrast, the materials comprising the degradable and compostable multilayered barrier films of the present invention do not use DEHP, and after use, are ultimately broken down to environmentally compatible water and carbon dioxide.

The articles and multilayer structures of the present invention can be formed by a variety of techniques, including extrusion, coextrusion, lamination, or conventional coating techniques. Preferably, hot-melt coextrusion is used to form the multilayered structures according to the present invention.

Coextrusion is a polymer processing method for bringing diverse polymeric materials together to form unitary layered structures, such as films, sheets, fibers, and tubing. This allows for unique combinations of materials, and for structures with multiple functions, such as, barrier characteristics, radiation resistance, and heat sealability. By combining coextrusion with blown film processing, film structures can be made which have no inherent waste and much lower capital investment over flat film coextrusion. However, flat film processing techniques provide an excellent method for making the degradable multilayered films, including barrier films, according to the present invention.

Component polymer or copolymer materials according to the present invention can be coextruded from the melt state in any shape which can be rapidly cooled to obtain a multilayered structures, such as barrier films, with a moisture barrier layer which includes mesophase propylene-based materials. The shape and/or thickness of the coextruded structure will be dependent upon the efficiency of the particular extrusion equipment employed and the quenching systems utilized. Generally, films and tubes are the preferred coextruded structures. Only under appropriate, low temperature conditions (i.e., below 60° C.), can multilayered structures be uniaxially, biaxially or multiaxially oriented to further enhances their physical properties without losing the mesophase form of polypropylene, mesopolymer blends, or mesocopolymers.

To obtain multilayered structures having mesophase propylene-based materials, such as mesomorphouspolypropylene, mesopolymer blends, and/or mesocopolymers, the coextruded structures must be quenched in a manner such that the mesophase form of polypropylene and/or mesocopolymer is obtained. Miller, "On the Existence of Near-Range Order in Isotactic Polypropylenes", in *Polymer, One*, 135 (1960), and U.S. Pat. No. 4,931,230, both of the disclosures of which are herein incorporated by reference, disclose suitable methods known to those skilled in the art for the preparation of mesophase form of polypropylene.

As described by these publications, various known methods of quenching as soon as possible, and preferably, immediately after extrusion, can be used to obtain a mesomorphous polypropylene homopolymer, mesopolymer blend, and/or mesocopolymer having the mesophase form of polypropylene and/or mesocopolymer therein. Quenching methods include plunging the coextruded structure into a cold liquid, for example, an ice water bath (i.e., quench bath), spraying the coextruded structure with a liquid, such as water, hitting the film with a stream of cold air, and/or running the coextruded structure over a cooled roll, quench roll, or drum.

The coextruded multilayered structures of the present invention, such as barrier or packaging films, are preferably quenched immediately after extrusion by contact with a quench roll, or by being plunge( into a quench bath. For a film thickness of from about 6μ to about 625μ, where a quench roll is used, roll temperature is maintained at a temperature below about 38° C., preferably below out 24° C., and the coextrudate is generally in contact with the quench roll until solidified. The quench roll should be positioned relatively close to the coextruder die, the distance being dependent on the roll temperature, the extrusion rate, the film thickness, and the roll speed. Generally, the distance from the die to the quench roll is about 0.25 cm to 5 cm. here a quench bath is used, the bath temperature is preferably maintained at a temperature below about 4° C. The bath should be positioned relatively close to the die, generally from about 0.25 cm to 13 cm from the die to the quench bath.

The degradable compositions and multilayered structures of the present invention will prove particularly useful in a number of manufactured articles and structures, such as multilayered packaging films, disposable medical garments, bags, and other components, and various hygiene articles.

Packaging films of a polyolefin layer containing the prodegradant system contacted with one or two polyolefin layers without the prodegradant system could serve to contain various perishable products, while at the same time substantially preventing the dispersal of the prodegradant system components into the perishable material. For example, a baby bottle liner could be formed from a degradable packaging film according to the present invention. In such an instance, the perishable product (i.e. baby formula, juice or water) would be shielded from the prodegradant containing layer of the film by a second layer not containing the prodegradant system. After use, such a bottle liner could be discarded into a municipal waste stream to be composted or otherwise oxidatively degraded.

The degradable and compostable multilayered barrier films according to the present invention will be especially useful in ostomy pouch applications, where security from odor, integrity of the device, and integrity of the underlying materials are requirements. Multilayered barrier films can be die cut and heat sealed with conventional equipment, and are compatible with current attachment systems and ostomy pouch manufacturing practices. Since the multilayered barrier films are moisture resistant both inside and out, the resulting ostomy pouch is capable of being worn during swimming and showering. In addition, other useful articles such as tapes, tubings, containers, transdermal drug-delivery patches and various packaging materials can also be formed from the multilayered structures of the present invention.

The degradable and compostable multilayered barrier films of the present invention are useful to form or cover a protective environment from an external environment, such that moisture and/or gases cannot substantially pass through to a perishable product contained therein, or a surface covered thereby. For example, the multilayered barrier films can be used to contain a food product or a pharmaceutical product in a protected environment, to which moisture and/or gases from the external environment cannot substantially pass into. Similarly, the multilayered barrier films can comprise a transdermal drug delivery patch, or medical tape, or an ostomy pouch, which protects the body of a mammal, or the waste products generated by the mammal, from degradation due to exposure to moisture and/or gases in the external environment.

The following examples are provided to illustrate presently contemplated preferred embodiments and the best mode for practicing the invention, but are not intended to be limiting thereof:

TEST PROCEDURES

Embrittlement

Embrittlement was determined by hand testing the samples. A state of embrittlement was defined as the time at which the samples had little or no tear or tensile strength remaining or would crumble when folded. With softer or lower melting polymers, such as polyethylene, the films did not generally disintegrate or crumble but rather became soft and lost all tensile strength.

Oxidative degradation was tested in dry forced-air ovens maintained at various temperatures. Compost conditions were simulated by placing the films into a jar of water which was then buffered to a pH of 6 by a phosphate buffer and heated to various temperatures. Samples were removed at various times from the dry ovens or simulated compost conditions and tested for embrittlement. Generally, these samples were tested at intervals of 8–24 hours.

Film Preparation

The single layer films of Examples 1–101 were prepared on a ¾" (1.9 cm) HAAKE™ extruder having a L/D ratio of 24:1 using 3 zones having temperatures; of 390° F. (199° C.), 410° F. (210° C.), and 430° F. (221° C.) with a die temperature of 430° F. These films were formed on a casting roll at a temperature of 70° F. (21° C.), and were taken off the roll so as to have a total thickness of 4.0 mils (102μ).

The two and three layer films of Examples 102–160 were prepared on conventional extrusion equipment using dual and triple manifold coextrusion dies maintained at a melt temperature of 232° C. The coextruded films were made at a total thickness of 2.0 mils (51μ), and were formed on a casting roll maintained at a temperature of 50° C. for the quenched films, or a temperature of 150° C. for the non-quenched films. The thickness of the respective layers of the two and three layer films were varied to determine the effect of layer thickness on overall film degradability.

EXAMPLES 1–14

The films were prepared as described above using 566 parts per million of manganese stearate (i.e., 50 ppm manganese), and 1 weight percent of the indicated natural oils (Table 1) in polypropylene (a Shell 5A95 9.5 MFI homopolymer with an anti-oxidant available from Shell Chemical Co., Houston, Tex.) with the exception of Example 14 which utilized 2 percent of a styrene-butadiene rubber (SBR) as an auto-oxidant. The SBR was incorporated as a concentrate consisting of 28% SBR in 72% Shell 7C04N PP/PE impact copolymer (35 MFI, 9% polyethylene).

Two inch (5 cm) by six inch (15 cm) samples were placed in trays in dry forced air ovens. The trays were removed periodically and the films were creased by hand. Embrittlement was defined as the point in time when the samples would first crack and fall apart when creased. In the Tables provided the greater than sign indicates that the testing was terminated at the noted time (in hours). The samples were tested at 60° C., 70° C., and 88° C. as noted in Table 1 below.

TABLE 1

| | | Time to Embrittlement (Hours) | | |
|---|---|---|---|---|
| Example | Auto-Oxidant | 88° C. | 70° C. | 60° C. |
| 1 | Coconut Oil | 55 | 257 | 600 |
| 2 | Almond Oil | 12 | 202 | 317 |
| 3 | Olive Oil | 36 | 202 | 410 |
| 4 | Castor Oil | 55 | 179 | 317 |
| 5 | Safflower Oil | 31 | 161 | 245 |
| 6 | Soy Oil | 5 | 161 | 291 |
| 7 | Wheat Germ Oil | 4.5 | 161 | 358 |
| 8 | Walnut Oil | 6 | 130 | 291 |
| 9 | Dehydrated Castor Oil | 4.5 | 130 | 317 |
| 10 | Cod Liver Oil | 12 | 94 | 190 |
| 11 | Sardine Oil | 11 | 57 | 149 |
| 12 | Tung Oil | 7 | 53 | 150 |
| 13 | Linseed Oil | 6 | 20 | 59 |
| 14 | SBR | 26 | 77 | 145 |

All samples were approximately 1–2 weeks old when tested. The table indicates that the oils containing more highly unsaturated fatty acid esters provide the fastest high temperature degradation at typical dry conditions.

EXAMPLES 15–28

Various films were prepared and tested, as described above for Examples 1–14, using 1 weight percent of various fatty acids and fatty acid derivatives as the auto-oxidants. All auto-oxidants were $C_{18}$ fatty acids or fatty acid derivatives with 0, 1 and 2 double bonds (stearic, oleic and linoleic, respectively). The samples were approximately 1–2 weeks old when tested. The results are given in Table 2. The results indicate that substitution of the fatty acid generally does not significantly effect the degradation rate of compositions using derivatives of typical fatty acids.

TABLE 2

| Example | Auto-Oxidant | 88° C. | 70° C. | 60° C. |
|---|---|---|---|---|
| 15 | Stearic Acid (C18, 0 DB) | 8–23 | 217 | 155 |
| 16 | Methyl Stearate | >800 | >800 | >800 |
| 17 | Ethyl Stearate | >800 | >800 | >800 |
| 18 | Propyl Stearate | 8–23 | 103 | 155 |
| 19 | Stearamide | 8–23 | 265 | 348 |
| 20 | Stearylamine | 8–23 | >800 | >800 |
| 21 | Stearyl Alcohol | 8–23 | 103 | 204 |
| 22 | Oleic Acid (C18, 1 DB) | 3.5 | 9–23 | 48 |
| 23 | Propyl Oleate | 8–23 | 48 | 120 |
| 24 | Oleamide | 30 | 48 | 102 |
| 25 | Oleyl Alcohol | 8–23 | 38 | 102 |
| 26 | Linoleic Acid (C18, 2 DB) | 5.5 | 23 | 38 |
| 27 | Methyl Linoleate | 10 | 38 | 78 |
| 28 | Propyl Linoleate | 10 | 38 | 116 |

The examples were also checked for degradation after storing at room temperature for 8.5 months. Examples 22 and 24–28 showed signs of embrittlement, however, Examples 15–21 and 23 were not embrittled at this date.

EXAMPLES 29–62

Samples were prepared, as described above for Examples 1–14, using various polypropylenes (unstabilized and stabilized, i.e., commercially available resins with anti-oxidants), stabilized polyethylenes and blends thereof as indicated in Table 3 using the procedure outlined above. All metals were added as metal stearates to provide the indicated concentration of metal. Samples were then placed in water jars and buffered to a pH of 6 using a phosphate buffer. The samples were tested for embrittlement as described above except for the polyethylenes and blends which were tested for softness and loss of tensile strength. The time for embrittlement is shown in Table 3 below. The samples were tested within one week after extrusion.

TABLE 3

| Ex. No. | Composition | 88° C. Hrs. | 60° C. Hrs. | 49° C. Hrs. |
|---|---|---|---|---|
| 29 | 5A95 PP + 50 ppm Co + 4% Oleic acid, | <16 | 43 | 85 |
| 30 | Unst. PP + 50 ppm Mn + 4% Oleic acid | 16 | 40 | 85 |
| 31 | Unst. PP + 50 ppm Fe + 4% Oleic acid | 16 | 65 | 88 |
| 32 | 5A95 PP + 50 ppm Co + 2% Linseed oil + 2% Stearic acid | 20 | 88 | 140 |
| 33 | Unst. PP + 50 ppm Fe + 2% Linseed oil + 2% Stearic acid | 40 | 85 | 85 |
| 34 | 5A95 PP + 50 ppm Mn + 4% Oleic acid | 40 | 110 | 195 |
| 35 | Unst. PP + 50 ppm Fe + 4% Stearic acid | 40 | 134 | 165 |
| 36 | 5A95 PP + 50 ppm Mn + 4% Linoleic acid | 42 | 46 | 88 |
| 37 | 5A95 PP + 50 ppm Mn + 2% Linseed oil + 2% Oleic acid | 42 | 96 | 120 |
| 38 | 5A95 PP + 50 ppm Mn + 2% Linseed oil + 2% Lauric acid | 42 | 115 | 190 |
| 39 | Unst. PP + 50 ppm Mn + 2% Linseed oil + 2% Stearic acid | 42 | 115 | 190 |
| 40 | 5A95 PP + 50 ppm Mn + 2% Linseed oil + Stearic acid | 42 | 195 | 195 |
| 41 | 6-166 PP/PE + 50 ppm Mn + 4% Oleic acid | 65 | 120 | 195 |
| 42 | 5A95 PP + 50 ppm V + 2% Linseed oil + 2% Stearic acid | 65 | 195 | 190 |
| 43 | 5A95 PP + 50 ppm Mn + 2% Tung Oil + 2% Stearic acid | 65 | 260 | 595 |
| 44 | 7C50 PP/PE + 50 ppm Mn + 4% Oleic acid | 88 | 115 | 195 |
| 45 | 7C50 PP/PE + 50 ppm Mn + 2% Linseed oil + 2% Stearic acid | 88 | 165 | 285 |
| 46 | Unstabilized 5A95 PP powder (100%) | 88 | 326 | 400 |
| 47 | 6180 HDPE + 50 ppm Mn + 2% Linseed oil + 2% Stearic acid | 96 | 235 | 475 |
| 48 | 5A95 PP + 50 ppm Fe + 2% Linseed oil + 2% Stearic acid | 110 | 650 | >700 |
| 49 | 1550P LDPE/5A95 PP(77/19) + 50 ppm Mn + 4% Oleic acid | 134 | 231 | 310 |
| 50 | 5A95 PP + 50 ppm Ce + 2% Linseed oil + 2% Stearic acid | 260 | 400 | >700 |
| 51 | 1550P LDPE/5A95 PP(77/19) + 50 ppm Mn + 2% Linseed Oil + 2% Stearic acid | 260 | 550 | >700 |
| 52 | 1550P LDPE + 50 ppm Mn + 4% Oleic acid | 260 | >700 | >700 |
| 53 | 1550P LDPE + 50 ppm Mn + 2% Linseed oil + 2% Stearic acid | 305 | >700 | >700 |
| 54 | 6180 HDPE + 50 ppm Mn + 4% Oleic acid | 400 | >700 | >700 |
| 55 | 5A95 PP + 50 ppm Mn + 2% Coconut oil + 2% Stearic acid | 405 | >700 | >700 |
| 56 | 5A95 PP + 50 ppm Ce + 4% Oleic acid | 455 | >700 | 400 |
| 57 | 5A95 PP + 50 ppm V + 4% Oleic acid | 545 | >700 | >700 |
| 58 | 6-166 PP/PE + 50 ppm Mn + 2% Linseed oil + 2% Stearic acid | 575 | 350 | >700 |
| 59 | 5A95 PP + 50 ppm Mn + 4% β-methylcinnamic acid | >700 | >700 | >700 |
| 60 | 5A95 PP + 50 ppm Mn + 4% Lauric acid | >700 | >700 | >700 |
| 61 | 5A95 PP + 50 ppm Fe + 4% Oleic acid | >700 | >700 | >700 |
| 62 | 5A95 PP + 50 ppm Mn + 4% Stearic acid | >700 | >700 | >700 |

1 5A95 is Shell 5A95.
2 Unstabilized PP is a 9.0 MFI material available from Shell.
3 7C50 PP/PB is Shell 7C50, 8.0 MPI and 8% PE.
4 6180 HDPE is NHD 6180 available from Quantum Co., Rolling Meadows, IL with an MI of 1.15 and a density of 0.960.
5 1550P LDPE is Tenite ™, 3.5 MPI and 8.0 MFI.
6 6-166 PP/PB is random copolymer available fron Shell, and 0.9 density, available from Hastman Chemical Products, Kingsport, TN.

Samples from Examples 29–62 were stored at room temperature for approximately 1900 hours and checked for embrittlement. Examples 29–41 samples showed evidence of embrittlement, while Examples 42–62 samples showed no signs of embrittlement.

Table 4 shows the embrittlement time for Examples 29–62 samples in a dry oven.

in Table 3 using the procedure outlined above. Samples were then placed in water jars and buffered to a pH of 6 using a phosphate buffer. The samples were tested for embrittlement as described above except for the polyethylenes and blends which were tested for softness and loss of tensile strength. The time for embrittlement is shown in Table 5 below. The samples were tested soon after extrusion.

TABLE 4

| Ex. No. | Composition | 88° C. Hrs. | 70° C. Hrs. | 60° C. Hrs. | 49° C. Hrs. |
|---|---|---|---|---|---|
| 29 | 5A95 PP + 50 ppm Co. + 4% Oleic Acid | 2 | 3 | 9 | 16 |
| 30 | Unst. PP + 50 ppm Mn + 4% Oleic acid | 1 | 3 | 7 | 18 |
| 31 | Unst. PP + 50 ppm Fe + 4% Oleic acid | 3.5 | 11 | 33 | 72 |
| 32 | 5A95 PP + 50 ppm Co + 2% Linseed oil + 2% Stearic Acid | 2 | 9 | 30 | 72 |
| 33 | Unst. PP + 50 ppm Fe + 2% Linseed Oil + 2% Stearic acid | 4.5 | 24 | 85 | 221 |
| 34 | 5A95 PP + 50 ppm Mn + 4% Oleic acid | 2 | 7 | 20 | 48 |
| 35 | Unst. PP + 50 ppm Fe + 4% Stearic acid | 6 | 18 | 60 | 143 |
| 36 | 5A95 PP + 50 ppm Mn + 4% Linoleic acid | 1.5 | 5 | 16 | 40 |
| 37 | 5A95 PP + 50 ppm Mn + 2% Linseed oil + 2% Oleic acid | 2 | .8 | 30 | 54 |
| 38 | 5A95 PP + 50 ppm Mn + 2% Linseed Oil + 2% Lauric acid | 2 | 7 | 20 | 55 |
| 39 | Unst. PP + 50 ppm Mn + 2% Linseed oil + 2% Stearic Acid | 3 | 9.5 | 36 | 94 |
| 40 | 5A95 PP + 50 ppm Mn + 2% Linseed Oil + 2% Stearic acid | 2 | 6 | 25 | 54 |
| 41 | 6-166 PP/PE + 50 ppm Mn + 4% Oleic acid | 6 | 22 | 46 | 97 |
| 42 | 5A95 PP + 50 ppm V + 2% Linseed oil + 2% Stearic acid | 17 | 84 | 335 | >800 |
| 43 | 5A95 PP + 50 ppm Mn + 2% Tung oil + 2% Stearic acid | 2.5 | 9 | 30 | 90 |
| 44 | 7C50 PP/PE + 50 ppm Mn + 4% Oleic acid | 3.5 | 12 | 37 | 76 |
| 45 | 7C50 PP/PE + 50 ppm Mn + 2% Linseed oil + 2% Stearic acid | 3 | 10 | 36 | 76 |
| 46 | Unstabilized 5A95 PP powder (100%) | 22.5 | 108 | 385 | >800 |
| 47 | HDPE + 50 ppm Mn + 2% Linseed oil + 2% Stearic acid | 8 | 34 | 120 | 294 |
| 48 | 5A95 PP + 50 ppm Fe + 2% Linseed oil + 2% Stearic acid | 53 | 235 | >800 | >800 |
| 49 | 1550P LDPE/5A95 PP(77/19) + 50 ppm Mn + 4% Oleic acid | 12.5 | 169 | 284 | 294 |
| 50 | 5A95 PP + 50 ppm Ce + 2% Linseed oil + 2% Stearic acid | 7 | 34 | 130 | 294 |
| 51 | 1550P LDPE/5A95 PP(77/19) + 50 ppm Mn + 2% Linseed oil + 2% Stearic acid | 25.5 | 114 | 212 | 433 |
| 52 | 1550P LDPE + 50 ppm Mn + 4% Oleic acid | 82 | 290 | 60 | >800 |
| 53 | 1550P LDPE + 50 ppm Mn + 2% Linseed oil + 2% Stearic acid | 82 | 470 | 740 | >800 |
| 54 | 6180 HDPE + 50 ppm Mn + 4% Oleic acid | 22 | 47 | 120 | 221 |
| 55 | 5A95 PP + 50 ppm Mn + 2% Coconut oil + 2 Stearic acid | 3 | 16 | 62 | 150 |
| 56 | 5A95 PP + 50 ppm Ce + 4% Oleic acid | 22 | 24 | 60 | 97 |
| 57 | 5A95 PP + 50 ppm V + 4% Oleic acid | 22.5 | 90 | 165 | 294 |
| 58 | 6-166 PP/PB + 50 ppm Mn + 2% Linseed oil + 2% Stearic acid | 4.5 | 13 | 51 | 94 |
| 59 | 5A95 PP + 50 ppm Mn + 4% β-methylcinnamic acid | 11.5 | 185 | 240 | >800 |
| 60 | 5A95 PP + 50 ppm Mn + 4% Lauric acid | 4 | 18 | 62 | 200 |
| 61 | 5A95 PP + 50 ppm Fe + 4% Oleic acid | 31 | 145 | 335 | 605 |
| 62 | 5A95 PP + 50 ppm Mn + 4% Stearic acid | 7 | 141 | 40 | 480 |

EXAMPLES 63–79

Samples were prepared using various polypropylenes (unstabilized and stabilized commercial polymers), stabilized polyethylenes and stabilized blends thereof as defined

TABLE 5

| Ex. No. | Composition | 88° C. Hrs. | 60° C. Hrs. | 49° C. Hrs. |
|---|---|---|---|---|
| 63 | 5A95 PP + 50 ppm Mn + 4% Erucic acid | 42 | 120 | 185 |
| 64 | 5A95 PP + 50 ppm Mn + 4% Linseed oil + 2% Euric acid | 42 | 113 | 190 |
| 65 | 5A95 PP + 50 ppm Mn + 4% Oleic acid | 45 | 120 | 210 |
| 66 | Unst. PP + 50 ppm Mn + 4% Oleic acid + 600 ppm Irg. 1010 | 70 | 190 | 210 |
| 67 | Unst. PP + 50 ppm Fe + 4% Oleic acid + 600 ppm Irg. 1010 | 70 | 190 | 330 |
| 68 | 5A95 PP + 50 ppm Mn + 2% Linseed oil + 2% Linolenic acid | 95 | 210 | 355 |
| 69 | 5A95 PP + 50 ppm Mn + 4% Linseed oil | 95 | 190 | 355 |
| 70 | 5A95 PP + 50 ppm Mn + 4% Linolenic acid | 165 | 230 | 240 |
| 71 | 1550P LDPE/5A95 PP (66:30) + 50 ppm Mn + 2% Linseed oil + 2% | 165 | 360 | >350 |

TABLE 5-continued

| Ex. No. | Composition | 88° C. Hrs. | 60° C. Hrs. | 49° C. Hrs. |
|---|---|---|---|---|
|  | Stearic acid |  |  |  |
| 72 | 1550P LDPE/5A95 PP (66:30) + 50 ppm Mn + 4% Oleic acid | 190 | >350 | 360 |
| 73 | 1550P LDPE/5A95 PP (76:20) + 50 ppm Mn + 4% Oleic acid | 210 | 240 | >350 |
| 74 | 1550P LDPE/5A95 PP (86:10) + 50 ppm Mn + 4% Oleic acid | 210 | 360 | >350 |
| 75 | 1550P LDPE/5A95 PP (76:20) + 50 ppm Mn + 2% Linseed oil + 2% Stearic acid | 220 | >350 | >350 |
| 76 | 1550P LDPE/5A95 PP (86:10) + 50 ppm Mn + 2% Linseed oil + 2% Stearic acid | 230 | >350 | >350 |
| 77 | 5A95 PP + 4% Oleic acid | 355 | 210 | 360 |
| 78 | 5A95 PP + 50 ppm Mn + 4% Tung Oil | 360 | >350 | >350 |
| 79 | 5A95 PP + 50 ppm Mn + 4% Coconut Oil | >350 | >350 | >350 |

1 Irganox 1010 is a hindered phenol available from Ciba-Geigy Co.

Table 6 shows the embrittlement time for Examples 63–79 samples in a dry oven.

DuPont Co., Wilmington Del.; Nucrel™ 960 is a polyethylene/methylacrylate copolymer (density=0.94, MFI= 60)

TABLE 6

| Ex. No. | Composition | 88° C. Hrs. | 70° C. Hrs. | 60° C. Hrs. | 49° C. Hrs. |
|---|---|---|---|---|---|
| 63 | 5A95 PP + 50 ppm Mn + 4% Erucic acid | 3 | 7.5 | 25 | 55 |
| 64 | 5A95 PP + 50 ppm Mn + 2% Linseed oil + 2% Erucic acid | 2 | 7 | 28 | 58 |
| 65 | 5A95 PP + 50 ppm Mn + 4% Oleic acid | 2 | 6 | 21 | 52 |
| 66 | Unst. PP + 50 ppm Mn + 4% Oleic acid + 600 Irg. 1010 | 3.75 | 7.5 | 26 | 55 |
| 67 | Unst. PP + 50 ppm Fe + 4% Oleic acid + 600 Irg. 1010 | 23 | 33 | 80 | 123 |
| 68 | 5A95 PP + 50 ppm Mn + 2% Linseed oil + 2% Linolenic acid | 2.5 | 8 | 26 | 65 |
| 69 | 5A95 PP + 50 ppm Mn + 4% Linseed oil | 3.5 | 10 | 34 | 65 |
| 70 | 5A95 PP + 50 ppm Mn + 4% Linolenic acid | 2.5 | 7 | 23 | 55 |
| 71 | 1550P LDPE/5A95 PP (66:30) + 50 ppm Mn + 2% Linseed oil + 2% Stearic acid | 20 | 33 | 315 | 244 |
| 72 | 1550P LDPE/5A95 PP (66:30) + 50 ppm Mn + 4% Oleic acid | 9.5 | 33 | 130 | 148 |
| 73 | 1550P LDPQ/5A95 PP (76:20) + 50 ppm Mn + 4% Oleic acid | 27 | 100 | 267 | 225 |
| 74 | 1550P LDPQ/5A95 PP (86:10) + 50 ppm Mn + 4% Oleic acid | 50 | 172 | 320 | 560 |
| 75 | 1550P LDPQ/5A95 PP (76:20) + 50 ppm Mn + 2% Linseed oil + 2% Stearic acid | 27 | 123 | 219 | 267 |
| 76 | 1550P LDPQ/5A95 PP (86:10) + 50 ppm Mn + 2% Linseed oil + 2% Stearic acid | 50 | 130 | 230 | >560 |
| 77 | 5A95 PP + Oleic acid | 25.5 | 90 | 95 | 155 |
| 78 | 5A95 PP + 50 ppm Mn + 4% Tung Oil | 3 | 16 | 58 | 123 |
| 79 | 5A95 PP + 50 ppm Mn + 4% Coconut Oil | 6 | 27 | 99 | 155 |

EXAMPLES 80–94

These films (4 mil caliper) were prepared in accordance with Examples 1–14 with the exception of Examples 83–89 which were 1 mil films (25.4 micrometers). The compositions included various naturally biodegradable polymers (Tone™ P-700 and Tone™ 767P are poly-e-caprolactones (PCL) available from Union Carbide of Danbury, Conn.; Bipol™ PHBV is a poly(hydroxybutyrate valerate) (12% valerate) available from ICI Americas, Inc.; Vinex™ 2025 and 2025U are polyethylene/vinyl-alcohol copolymers available from Air Products & Chemicals, Inc. of Allentown, Pa.; Elvax™ 260 is an ethylene/vinyl acetate copolymer (EVA) (28% vinyl acetate and 6 MFI) available from available from DuPont Co. The poly-L-lactide has an intrinsic viscosity of 1.04 and is available from Birmingham Polymers, Inc. The polyesteramide-10,2 (PEA) has an intrinsic viscosity of 0.7 and is available from 3M Company, St. Paul, Minn., and Pamolyn™ 100 (PAM) is an oleic acid (91%) available from Hercules, Inc., Wilmington, Del.).

Films from Examples 81 and 82 were tested for degradation in water and air as described above at 60° C. The Example 81 films became embrittled at 43 hours in air and 112 hours in water. The Example 82 films became embrittled at 53 hours in air and 332 hours in water. The times to embrittlement in air for Examples 83–94 are given in Table 7 below.

TABLE 7

| Ex. No. | Composition | 88° C. Hrs. | 70° C. Hrs. | 60° C. Hrs. | 49° C. Hrs. |
|---|---|---|---|---|---|
| 83 | 3% POLY-L-LACTIDE + 2% PAM 100 | 72 | 465 | 850 | >850 |
| 84 | 6% POLY-L-LACTIDE + 2% PAM 100 | 152 | 370 | >850 | >850 |
| 85 | 9% POLY-L-LACTIDE + 2% PAM 100 | 80 | 320 | 750 | >850 |
| 86 | 9% PEA-10,2 + 2% PAM 100 | 63 | 365 | >850 | >850 |
| 87 | 5% PCL + 20% 7C50 + 2% PAM 100 | 50 | 130 | 290 | 750 |

TABLE 7-continued

| Ex. No. | Composition | 88° C. Hrs. | 70° C. Hrs. | 60° C. Hrs. | 49° C. Hrs. |
|---|---|---|---|---|---|
| 88 | 5% VINEX 2025U PVA + 20% 7C50 + 2.5% ELVAX 260 EVA + 2% PAM 100 | 50 | 76 | 225 | >850 |
| 89 | 5% PHBV (12% V) + 20% 7C50 + 2.5% ELVAX 260 EVA + 2% PAM 100 | 50 | 225 | 490 | >850 |
| 90 | 20% P700 + 2% PAM 100 | 6 | 24 | 52 | 100 |
| 91 | 20% 2025 PVA + 2% PAM 100 | 60 | 155 | 245 | 370 |
| 92 | 20% PVA + 10% NUCREL 960 + 2% PAM 100 | 50 | 175 | 325 | 465 |
| 93 | 20% PVA + 10% ELVAX 260 + 2% PAM 100 | 225 | 175 | 290 | 465 |
| 94 | 20% PHBV + 10% ELVAX 260 + 2% PAM 100 | — | — | — | — |

| 80) | Shell 5A95 | 88.94% |
| | Tone P-700 | 10.00% |
| | Tung Oil | 1.00% |
| | Manganese (Mn) Stearate | 0.06% |
| 81) | Shell 5A95 | 85.94% |
| | Tone 767P | 10.00% |
| | Pamolyn™ 100 | 4.00% |
| | Mn Stearate | 0.06% |
| 82) | Shell 5A95 | 85.94% |
| | Bipol™ PHBV | 10.00% |
| | Pamolyn® 100 | 4.00% |
| | Mn Stearate | 0.06% |

Examples 82 was of poor quality because of the incompatibility of PHBV with polyolefins.

| 83) | Tenite™ 1550P | 94.94% |
| | poly-L-lactide | 3.00% |
| | Pamolyn™ 100 | 2.00% |
| | Mn Stearate | 0.06% |
| 84) | Tenite™ 1550P | 91.94% |
| | poly-L-lactide | 6.00% |
| | Pamolyn™ 100 | 2.00% |
| | Mn Stearate | 0.06% |
| 85) | Tenite™ 1550P | 88.94% |
| | poly-L-lactide | 9.00% |
| | Pamolyn™ 100 | 2.00% |
| | Mn Stearate | 0.06% |
| 86) | Tenite™ 1550P | 88.94% |
| | polyesteramide-10,2 | 9.00% |
| | Pamolyn™ 100 | 2.00% |
| | Mn Stearate | 0.06% |
| 87) | Tenite™ 1550P | 72.94% |
| | Tone P-700 | 5.00% |
| | Shell 7C50 PP/PE copolymer | 20.00% |
| | Pamolyn™ 100 | 2.00% |
| | Mn Stearate | 0.06% |
| 88) | Tenite™ 1550P | 72.94% |
| | Vinex™ 2025U | 5.00% |
| | Shell 7C50 PP/PE | 17.50% |
| | Elvax™ 260 | 2.50% |
| | Pamolyn™ 100 | 2.00% |
| | Mn Stearate | 0.06% |
| 89) | Tenite™ 1550P | 72.94% |
| | Bipol™ PHBV | 5.00% |
| | Shell 7C50 | 17.50% |
| | Elvax™ 260 | 2.50% |
| | Pamolyn™ 100 | 2.00% |
| | Mn Stearate | 0.06% |

EXAMPLES 90–04

(4 mil PP/PE copolymer films)

| 90) | Shell 7C50 | 78.35% |
| | Tone™ P-700 | 19.59% |
| | Pamolyn™ 100 | 2.00% |
| | Mn Stearate | 0.06% |
| 91) | Shell 7C50 | 78.35% |
| | Vinex™ 2025 | 19.59% |
| | Pamolyn™ 100 | 2.00% |
| | Mn Stearate | 0.06% |
| 92) | Shell 7C50 | 68.56% |
| | Vinex™ 2025 | 19.59% |
| | Nucrel™ 960 | 9.79% |
| | Pamolyn™ 100 | 2.00% |
| | Mn Stearate | 0.06% |
| 93) | Shell 7C50 | 68.50% |
| | Vinex™ 2025U | 19.59% |
| | Elvax™ 260 | 9.79% |
| | Pamolyn™ 100 | 2.00% |
| | Mn Stearate | 0.06% |
| 94) | Shell 7C50 | 82.95% |
| | Bipol™ PHBV | 10.00% |
| | Elvax™ 260 | 5.00% |
| | Pamolyn™ 100 | 2.00% |
| | Mn Stearate | 0.06% |

EXAMPLES 95–98

Films were prepared and tested as described above for Examples 1–14, using unstabilized polypropylene with 2% added Pamolyn™ 100 and 400 ppm Fe (as Fe Stearate) at various levels of Irganox™ 1010. The films were tested for embrittlement at various temperatures as indicated in Table 8 below.

TABLE 8

| Example | Irganox™ (PPM) | 55° C. Hrs. | 70° C. Hrs. | 60° C. Hrs. | 49° C. Hrs. |
|---|---|---|---|---|---|
| 95 | 0 | 4 | 13 | 40 | 96 |
| 96 | 200 | 7.5 | 34 | 96 | 215 |
| 97 | 600 | 20 | 80 | 260 | 650 |
| 98 | 1000 | 39 | 215 | 1500 | — |

The films were also kept on a shelf at room temperature for approximately 3,900 hours and tested for embrittlement. The Examples 95 and 96 films had embrittled at this time, but the Examples 97 and 98 films had not.

EXAMPLES 99–101

Immature compost was allowed to dry until it contained only 5% water. To 1000 g of this compost were added 200 g of dried, shredded maple leaves, 6 g of Compost Plus (Ringer Corporation, Minneapolis, Minn.) and sufficient water to yield of mixture of 54% water. The compost mixture was placed in a wire mesh basket in a Nalgene tank (Nylon-14"×10"×10" from Fisher) in a forced air oven at 50° C. The compost was aerated from the bottom by suspending the wire basket over two glass frits (10"×1.5") in a pool of water through which air was bubbled. The compost mixture containing the film sample was piled in the wire basket so that the samples were completely covered. Several samples could be tested in one such apparatus.

The test period was one month. The initial carbon-to-nitrogen ratio of the compost mixture was 40:1. The pH of the system remained relatively neutral, ranging from 5.5–7.0. Moisture was maintained at 45–55% by adding water as necessary. The compost was manually turned daily and film samples were checked for embrittlement. Embrittlement was not as pronounced in the simulated compost test as it was in the dry oven tests however roughly correlated to the water jar test results. Films usually tore first in one direction, and then both, before becoming brittle. Embrittlement times for Examples 99–101 are listed in Table 9 below.

TABLE 9

| Example | Film | Compost 50° C. |
|---|---|---|
| 99 | 5A95 PP + 50 ppm Co + 4% Oleic Acid | 10 days |
| 100 | Unstab. 5A95 PP + 50 ppm Mn + 4% Oleic acid | 27 days |
| 101 | 5A95 PP/Tone ™ 767P PCL (9:1) + 50 ppm Mn + Oleic Acid | 26 days |

EXAMPLES 102–121

Two-layer films were prepared as described above. The first layer of each film was approximately 1.75 mil (45μ) thick, and the second layer was approximately 0.25 mil (6μ) thick, for a total film thickness of approximately 2 mil (51μ). A prodegradant system of 2840 parts per million (ppm) of manganese stearate (i.e. 250 ppm manganese, 50 ppm Mn (568 ppm Mn sterate) for Example film No. 118)(Mooney Chemical, Cleveland, Ohio), and 2 weight percent of Oleic acid (OA)(Kodak Chemical Co., Rochester, N.Y.) was incorporated into either the first layer or the first and second layer of the two-layer films. The polyolefin polymer resins used to form these films included, Shell polypropylene resin No. 5A95 (Shell Chemical Co., Houston, Tex.), Tenite™ low densitypolyethylene resin No. 1550P (Eastman Chemical, Kingston, Tenn.), and Quantum Chemical polyethylene resin No. NA 952 (Quantum Co., Rolling Meadows, Ill.).

Two inch (5 cm) by six inch (15 cm) samples of each of the films were placed in trays in dry forced air ovens, and were tested for embrittlement at 49° C., 60° C., and 70° C., according to the procedures of Examples 1–14. In addition, the samples were also placed in water jars and were tested for embrittlement according to the procedures of Examples 29–62. The specific composition and time to embrittlement in hours for each of the Example films is shown in Table 10 below. The letter "Q" indicates films that were formed by quenching at 50° C., while "NQ" indicates films that were nonquenched by being formed at a temperature of 150° C.

TABLE 10

| Ex. No. | Composition of layers 1st layer = 1.75 mil (45μ) thick 2nd layer = 0.25 mil (6μ) thick | 70° C. Hrs. Dry | 60° C. Hrs. Dry | 49° C. Hrs. Dry | 60° C. Hrs. Wet |
|---|---|---|---|---|---|
| 102 | 1st: 5A95 PP + 250 ppm Mn + 2% OA, 2nd: 5A95 PP (Q) | 17 | 33 | 65 | 270 |
| 103 | 1st: 5A95 PP + 250 ppm Mn + 2% OA, 2nd: 5A95 PP (NQ) | 17 | 25 | 41 | 270 |
| 104 | 1st: 5A95 PP/1550P PE (1:1) + 250 ppm Mn + 2% OA, 2nd: 5A95 PP (Q) | 25 | 33 | 66 | 360 |
| 105 | 1st: 5A95 PP/1550P PE (1:1) + 250 ppm Mn + 2% OA, 2nd: 5A95 PP (NQ) | 25 | 33 | 66 | 394 |
| 106 | 1st: 1550P PE + 250 ppm Mn + 2% OA, 2nd: 5A95 PP (Q) | 46 | >122 | 262 | 270 |
| 107 | 1st: 1550P PE + 250 ppm Mn + 2% OA, 2nd: 5A95 PP (NQ) | 49 | 122 | 262 | 239 |
| 108 | 1st: 5A95 PP + 250 ppm Mn + 2% OA, 2nd: 1550P PE (Q) | 7 | 17 | 41 | 176 |
| 109 | 1st: 5A95 PP + 250 ppm Mn + 2% OA, 2nd: 1550P PE (NQ) | 17 | 33 | 41 | 239 |
| 110 | 1st: 5A95 PP/1550P PE (1:1) + 250 ppm Mn + 2% OA, 2nd: 1550P PE (Q) | 17 | 33 | 65 | 270 |
| 111 | 1st: 5A95 PP/1550P PE (1:1) + 250 ppm Mn + 2% OA, 2nd: 1550P PE (NQ) | 17 | 33 | 66 | 239 |
| 112 | 1st: 5A95 PP + 250 ppm Mn + 2% OA, 2nd: 1550P PE + 250 ppm Mn + 2% OA (Q) | 7 | 17 | 262 | 176 |
| 113 | 1st: 5A95 PP + 250 ppm Mn + 2% OA, 2nd: 1550P PE + 250 ppm Mn + 2% OA (NQ) | 17 | 17 | 41 | 89 |
| 114 | 1st: 1550P PE + 250 ppm Mn + 2% OA, 2nd: 5A95 PP + 250 ppm Mn + 2% OA (Q) | 33 | 47 | 140 | 270 |
| 115 | 1st: 1550P PE + 250 ppm Mn + 2% OA, 2nd: 5A95 PP + 250 ppm Mn + 2% OA (NQ) | 49 | 33 | 262 | 239 |
| 116 | 1st: 5A95 PP + 250 ppm Mn + 2% OA, 2nd: 5A95 PP (Q) | 39 | 39 | 67 | 245 |
| 117 | 1st: 5A95 PP/1500P PE (1:1) + 250 ppm Mn + 2% OA, | 47 | 89 | 119 | 245 |

TABLE 10-continued

| Ex. No. | Composition of layers<br>1st layer = 1.75 mil (45μ) thick<br>2nd layer = 0.25 mil (6μ) thick | 70° C.<br>Hrs.<br>Dry | 60° C.<br>Hrs.<br>Dry | 49° C.<br>Hrs.<br>Dry | 60° C.<br>Hrs.<br>Wet |
|---|---|---|---|---|---|
| | 2nd: 5A95 PP (Q) | | | | |
| 118 | 1st: 5A95 PP/1550P PE (1:1) + 50 ppm Mn + 2% OA,<br>2nd: 1550P PE (Q) | 47 | 67 | 111 | 215 |
| 119 | 1st: 5A95 PP + 250 ppm Mn + 2% OA,<br>2nd: 1550P PE (Q) | 29 | 39 | 68 | 215 |
| 120 | 1st: 5A95 PP/1550P PE (3:1) + 250 ppm Mn + 2% OA,<br>2nd: 1550P PE (Q) | 29 | 68 | 69 | 245 |
| 121 | 1st: 5A95 PP/Quantum PE (1:1) + 250 ppm Mn + 2% OA,<br>2nd: 1550P PE (Q) | 39 | 67 | 111 | 245 |

Table 10 shows among other things that two-layer polyolefin films, wherein one of the layers does not contain the prodegradant system of the present invention, will oxidatively degrade under a variety of conditions, including simulated composting conditions. In fact, degradation for such films occurs at comparable rates with those films that contain the prodegradant system in all layers (e.g. Example film Nos. 112– 115). Furthermore, radiation degradation-resistant films formed of mesophase propylene-based materials can be made to degrade at comparable rates to the same films formed from crystalline polypropylene using the prodegradant system of the present invention (compare e.g. Example film Nos. 102 versus 103, and 108 versus 109).

EXAMPLES 122–142

Two-layer films were prepared using the same methods and materials as Examples 102–121, except that the first layer of each film was approximately 1.00 mil (51μ) thick, and the second layer was also approximately 1.00 mil (51μ) thick, for a total film thickness of approximately 2 mil (51μ). Example films 122– 142 were tested under the same condition as for Examples 102–121. The specific composition and time to embrittlement in hours for each of the Example films is shown in Table 11 below.

TABLE 11

| Ex. No. | Composition of layers<br>1st layer = 1.00 mil (25μ) thick<br>2nd layer = 1.00 mil (25μ) thick | 70° C.<br>Hrs.<br>Dry | 60° C.<br>Hrs.<br>Dry | 49° C.<br>Hrs.<br>Dry | 60° C.<br>Hrs.<br>Wet |
|---|---|---|---|---|---|
| 122 | 1st: 1550P PE + 250 ppm Mn + 2% OA,<br>2nd: 5A95 PP + 250 ppm Mn + 2% OA (Q) | 7 | 25 | 41 | 270 |
| 123 | 1st: 1550P PE + 250 ppm Mn + 2% OA,<br>2nd: 5A95 PP + 250 ppm Mn + 2% OA (NQ) | 13 | 33 | 66 | 233 |
| 124 | 1st: 1550P PP + 250 ppm Mn + 2% OA,<br>2nd: 1550P PE + 250 ppm Mn + 2% OA | 7 | 25 | 41 | 176 |
| 125 | 1st 1550P PP + 250 ppm Mn + 2% OA,<br>2nd: 1550P PE + 250 ppm Mn + 2% OA (NQ) | 13 | 25 | 41 | 145 |
| 126 | 1st: 5A95 PP/1550P PE (1:1) + 250 ppm Mn + 2% OA,<br>2nd: 1550P PE (Q) | 17 | 47 | 66 | 239 |
| 127 | 1st: 5A95 PP/1550P PE (1:1) + 250 ppm Mn + 2% OA,<br>2nd: 1550P PE (Q) | 13 | 33 | 66 | 145 |
| 128 | 1st: 5A95 PP + 250 ppm Mn + 2% OA,<br>2nd: 1550P PE (Q) | 17 | 17 | 41 | 176 |
| 129 | 1st: 5A95 PP + 250 ppm Mn + 2% OA,<br>2nd: 1550P PE (NQ) | 13 | 33 | 42 | 239 |
| 130 | 1st: 1550P PE + 250 ppm Mn + 2% OA,<br>2nd: 5A95 PP (Q) | 73 | >72 | 163 | 394 |
| 131 | 1st: 1550P PE + 250 ppm Mn + 2% OA,<br>2nd: 5A95 PP (NQ) | 73 | 144 | 262 | 270 |
| 132 | 1st: 5A95 PP/1550P PE (1:1) + 250 ppm Mn + 2% OA,<br>2nd: 5A95 PP (Q) | 33 | 47 | 94 | — |
| 133 | 1st: 5A95 PP/1550P PE (1:1) + 250 ppm Kn + 2% OA,<br>2nd: 5A95 (NQ) | 25 | 72 | 94 | 945 |
| 134 | 1st: 5A95 PP + 250 ppm Mn + 29 OA,<br>2nd: 5A95 PP (Q) | 17 | 47 | 93 | 409 |
| 135 | 1st: 5A95 PP + 250 ppm Mn + 2% OA,<br>2nd: 5A95 PP (Q) | 33 | 47 | 65 | 394 |
| 136 | 1st: 5A95 PP + 250 ppm Mn + 2% OA,<br>2nd: 5A95 PP (Q) | 47 | 47 | 137 | 245 |
| 137 | 1st: 5A95 PP/1550P PE (1:1) + 50 ppm Mn + 2% OA,<br>2nd: 1550P PE (Q) | 3 | 69 | 89 | 245 |
| 138 | 1st: 5A95 PP + 250 ppm Mn + 2% OA,<br>2nd: 1550P PE (Q) | 29 | 39 | 89 | 245 |
| 139 | 1st: 5A95 PP/1550P PE (1:1) + 250 ppm Mn + 2% OA,<br>2nd: 1550P PE (Q) | 39 | 90 | 91 | 245 |
| 140 | 1st: 5A95 PP/1550P PE (1:3) + 250 ppm Mn + 2% OA,<br>2nd: 1550P PE (Q) | 67 | 119 | 211 | 245 |
| 141 | 1st: 5A95 PP/1550P PE (3:1) + 250 ppm Mn + 2% OA, | 29 | 39 | 67 | 245 |

TABLE 11-continued

| Ex. No. | Composition of layers<br>1st layer = 1.00 mil (25μ) thick<br>2nd layer = 1.00 mil (25μ) thick | 70° C.<br>Hrs.<br>Dry | 60° C.<br>Hrs.<br>Dry | 49° C.<br>Hrs.<br>Dry | 60° C.<br>Hrs.<br>Wet |
|---|---|---|---|---|---|
| 142 | 2nd: 1550P PE (Q)<br>1st: 5A95 PP/Quantum PE (1:1) + 250 ppm Mn + 2% OA,<br>2nd: 1550P PE (Q) | 29 | 47 | 92 | 245 |

The films shown in Table 11 demonstrate analogous degradation results to those of Example films 102–121, tested under the same condition as for Examples 102–121. The specific composition and time to embrittlement in hours for each of the Example films is shown in Table 12 below.

TABLE 12

| Ex. No. | Composition of layers<br>1st layer = 0.25 mil (6μ) thick<br>2nd layer = 1.50 mil (38μ) thick<br>3rd layer = 0.25 mil (6μ) thick | 70° C.<br>Hrs.<br>Dry | 60° C.<br>Hrs.<br>Dry | 49° C.<br>Hrs.<br>Dry | 60° C.<br>Hrs.<br>Wet |
|---|---|---|---|---|---|
| 143 | 1st: 1550P PE,<br>2nd: 5A95 PP + 250 ppm Mn + 2% OA,<br>3rd: 1550P PE (NQ) | 8 | 28 | 52 | 312 |
| 144 | 1st: 1550P PE,<br>2nd: 5A95 PP/1550P PE (1:1) + 250 ppm Mn + 2% OA,<br>3rd: 1550P PE (NQ) | 25 | 47 | 94 | 409 |
| 145 | 1st: 5A95 PP,<br>2nd: 1550P PE + 250 ppm Mn + 2% OA,<br>3rd: 1550P PE (NQ) | 33 | 122 | 290 | 825 |
| 146 | 1st: 5A95 PP,<br>2nd: 5A95 PP/1550P PE (1:1) + 250 ppm Mn + 2% OA,<br>3rd: 5A95 PP (NQ) | 33 | 47 | 93 | 611 |
| 147 | 1st: 5A95 PP + 250 ppm Mn + 2% OA,<br>2nd: 1550P PE + 250 ppm Mn + 2% OA,<br>3rd: 5A95 PP + 250 ppm Mn + 2% OA (NQ) | 33 | 33 | 141 | 270 |
| 148 | 1st: 5A95 PP + 250 ppm Mn + 2% OA,<br>2nd: 5A95 PP/1550P PE (1:1) + 250 ppm Mn + 2% OA,<br>3rd: 5A95 PP + 250 ppm Mn + 2% OA (NQ) | 25 | 47 | 66 | 360 |
| 149 | 1st: 5A95 PP + 250 ppm Mn + 2% OA,<br>2nd: 5A95 PP/Vintex 1003 (1:1),<br>3rd: Vinex 1003 (Q) | 25 | 33 | 41 | 89 |
| 150 | 1st: 5A95 PP + 250 ppm Mn + 2% OA,<br>2nd: 400 PB/Vinex 1003 (1:1),<br>3rd: Vinex 1003 (Q) | 33 | 25 | 94 | 360 |
| 151 | 1st: 5A95 PP + 250 ppm Mn + 2% OA,<br>2nd: 400 PB<br>3rd: Vinex 1003 (Q) | 25 | 47 | 87 | 89 |
| 152 | 1st: 5A95 PP + 250 ppm Mn + 2% OA,<br>2nd: Vinex 1003/5A95 PP/400 PB (2:1:1)<br>3rd: Vinex 1003 (Q) | 33 | 47 | 116 | 409 |

Table 10. In addition, the data also show that even when the non-prodegradant containing layer of the two-layer films is as thick as the prodegradant containing layer, the overall films still oxidatively degrade under a variety of conditions, including simulated composting conditions. In fact, degradation for these films occurs at comparable rates with films of Examples 102–122, wherein the non-prodegradant containing layer is seven times thinner than the prodegradant containing layer.

EXAMPLES 143–152

Three-layer films were prepared using the same methods and materials as Examples 102–121. Additional polymers used include Shell polybutylene resin No. 400 (Shell Chemical Co.) and Vinex™ polyvinylalcohol resin No. 1003 (Air Products, Allentown, Pa.). The first layer of each film was approximately 0.25 mil (6μ) thick, the second layer was approximately 1.50 mil (38μ) thick, and the third layer was approximately 0.25 mil (6μ) thick, for a total film thickness of approximately 2 mil (51μ). Example films 143–152 were tested under the same condition as for Examples 102–121. The specific composition and time to embrittlement in hours for each of the Example films is shown in Table 12 below.

Table 12 shows among other things that three-layer films, such as Example film No. 143, that contain two layers without the prodegradant system, degrade at comparable rates to an analogous two-layered structure (i.e. Example film No. 109) containing only one layer without the prodegradant system of the present invention. Furthermore, barrier film structures using a Vinex™ poly vinyl alcohol resin No. 1003 as a gas barrier layer (i.e. Example films Nos. 149–152) degrade and compost within the requirements of the present invention.

EXAMPLES 153–154, AND COMPARATIVE EXAMPLES 155–156

The crystalline structure, or mesomorphous structure, for two single-layer films, and two five-layered barrier films containing polypropylene polymer was determined by wide-angle x-ray diffraction (WAXD). The single layer films were formed as described above from Fina polypropylene resin No. 3576 (Fina Oil and Chemical Co.) containing the prodegradant system of the present invention at a film thickness of approximately 100μ. Example film No. 153 was quenched (Q) after extrusion on a casting roll maintained at 10° C., so as to form predominantly mesomorphous polypropylene, while Comparative Example film No. 155 was cast onto a roll maintained at 66° C. (NQ), thereby yielding crystalline polypropylene structure.

The five-layered barrier films were prepared as described above, except that 3 extruders, and a 5-layer Cloeren™ feedblock (Cloeren Company, Orange, Tex.) connected to a single manifold film extrusion die were utilized to form the films. The barrier films were generally coextruded at a total film thickness of about 75μ, including a core layer of EVAL™ brand ethylene vinyl alcohol (EVOH) resin No. 10A (Evalca Inc.; approx. 8μ), followed by opposing polypropylene-based adhesive layers of Admer™ resin No. QF551A (Mitsui Plastics, Inc.), and finally by opposing layers of Fina polypropylene resin No. 3576 with the pro-degradant system of the present invention incorporated therein. The construction of Example film 154 was quenched at 10° C., while that of Comparative Example film 156 was cast at 66° C.

Figure 3:
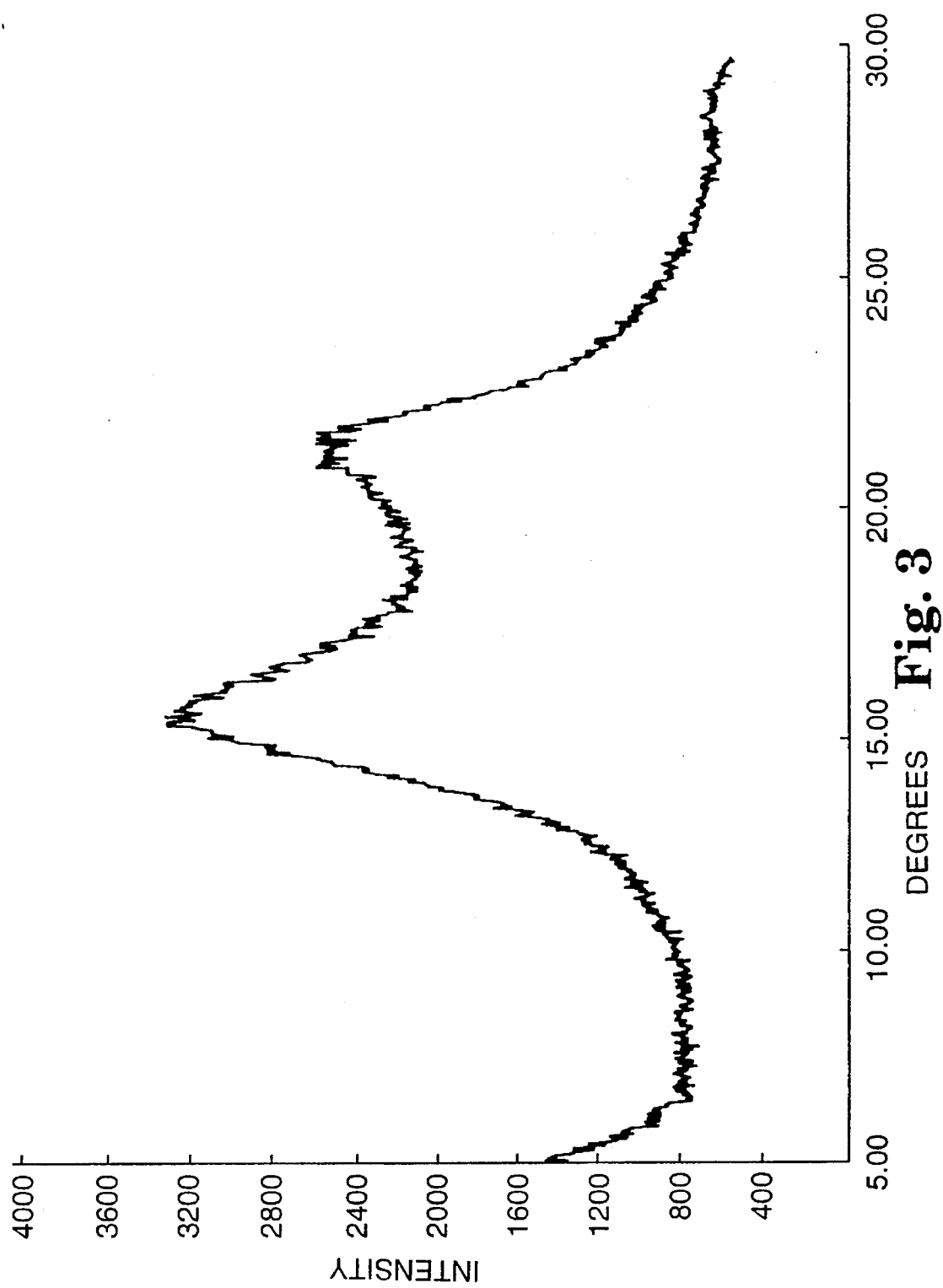
FIG. 3 is the wide-angle x-ray diffraction pattern of the multilayered barrier film of Example 153.
Figure 4:
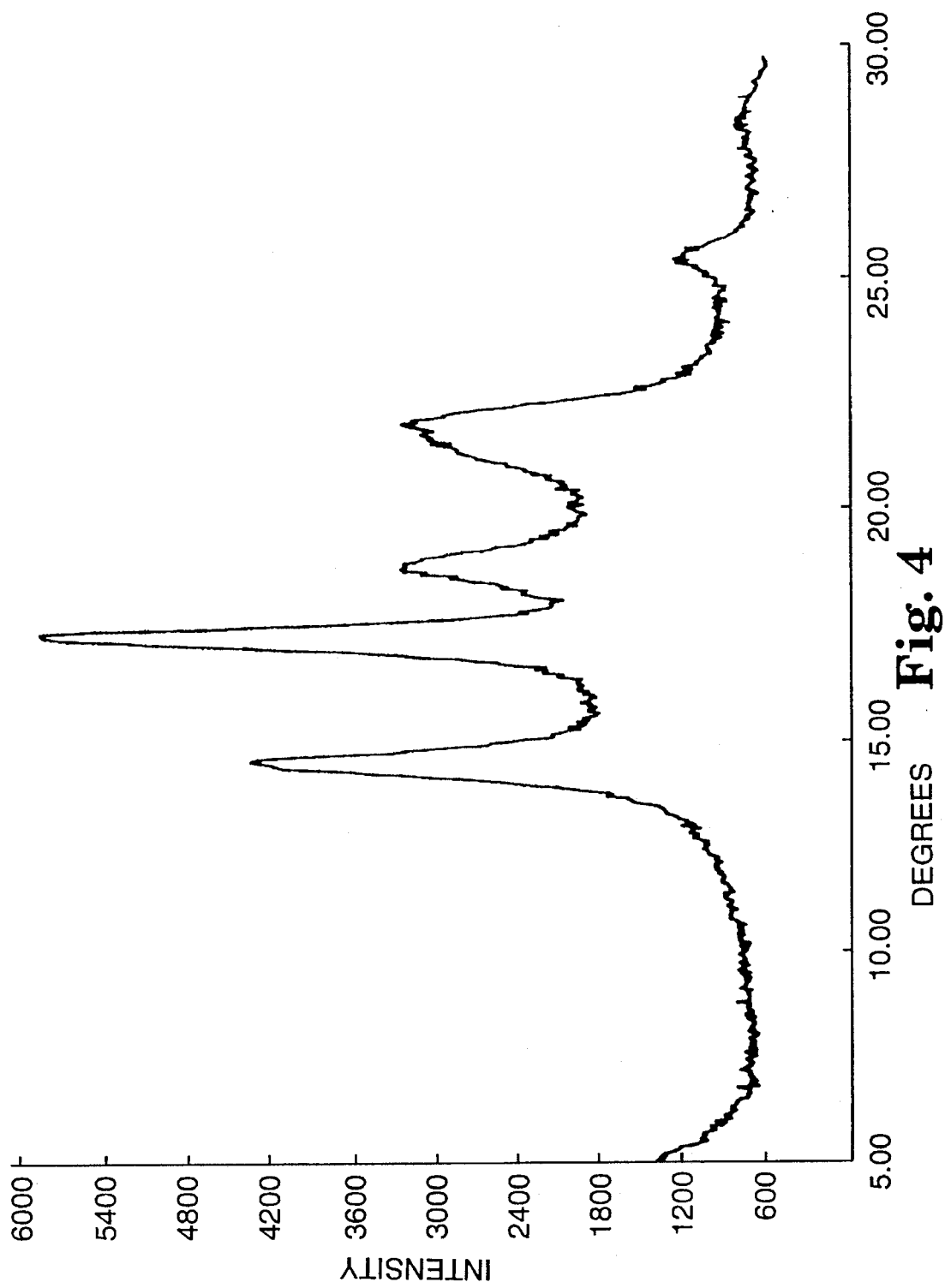
FIG. 4 is the wide-angle x-ray diffraction pattern of the multilayered barrier film of Comparative Example 155.

The specific constructions of Example films 153–154, and Comparative Example films 155–156 are shown in Table 13. In addition, graphical illustrations of the WAXD scans for each of the Example and Comparison Example films are shown in FIGS. 1 through 4 herein. The mesophase form (i.e., mesomorphous polypropylene) is clearly shown in FIGS. 1 and 2. In contrast, FIGS. 3 and 4 show the sharp peaks associated with crystalline polybutylene.

TABLE 13

Specific film constructions of Example films 153–154, and Comparative Example films 155–156, and structure of the films as determined by WAXD (Meso = mesomorphic, Crys = crystalline).

| Ex. No. | Film Composition | WAXD |
|---|---|---|
| 153 | 3576 PP + 250 ppm Mn + 2% OA (Q) | Meso |
| 154 | 1st layer: 3576 PP + 250 ppm Mn + 2% OA (Q)<br>2nd layer: ADMER ™ QF551A<br>3rd layer: EVAL ™ 105A (EVOH)<br>4th layer: ADMER ™ QF551A<br>5th layer: 3576 PP + 250 ppm Mn + 2% OA (Q) | Meso |
| 155 | 3576 PP + 250 ppm Mn + 2% OA (NQ) | Crys |
| 156 | 1st layer: 3576 PP + 250 ppm Mn + 2% OA (NQ)<br>2nd layer: ADMER ™ QF551A<br>3rd layer: EVAL ™ 105A (EVOH)<br>4th layer: ADMER ™ QF551A<br>5th layer: 3576 PP + 250 ppm Mn + 2% OA (NQ) | Crys |

EXAMPLES 157–161

Five, five-layered barrier films were made according to the same methods as for the films Example 154 and Comparative Example 156. In addition to the polymers utilized in Example 154 and Comparative Example 156, several of the barrier films of Examples 157–161 also used Shell polybutylene resin No. 0400 (Shell Chemical Co.), PRIMACOR™ brand ethylene acrylic acid resin No. 3340 (Dow Chemical Co.), QUANTUM™ brand ethylene vinyl acetate resin No. UE656-033 (Quantum Chemical Co.). In addition to the prodegradant system of the present invention, Example film 161 also incorporated IRGANOX™ brand antioxidant No. 1010 (Ciba-Geigy, Inc.) into its outer layers (i.e. the first and fifth layers). The specific constructions of Example films 157–161 are shown in Table 14 below.

TABLE 14

Specific film constructions of Example films 157–161.

| Ex. No. | Film composition for each Layer |
|---|---|
| 157 | 1st layer: 3576 PP/0400 PB (1:1) + 250 ppm Co + 2% OA (NQ)<br>2nd layer: ADMER ™ QF551A<br>3rd layer: EVAL ™ 105A (EVOH)<br>4th layer: ADMER ™ QF551A<br>5th layer: 3576 PP/0400 PB (1:1) + 250 ppm Co + 2% OA (NQ) |
| 158 | 1st layer: 3576 PP/0400 PB/UE656-033 EVA (3:3:2) + 250 ppm Mn + 2% OA (Q)<br>2nd layer: ADMER ™ QF551A<br>3rd layer: EVAL ™ 105A (EVOH)<br>4th layer: ADMER ™ QF551A<br>5th layer: 3576 PP/0400 PB/UE656-033 EVA (3:3:2) + 250 ppm Mn + 2% OA (Q) |
| 159 | 1st layer: 3576 PP/0400 PB/3340 EAA (3:3:2) + 250 ppm Mn + 2% OA (Q)<br>2nd layer: ADMER ™ QF551A<br>3rd layer: EVAL ™ 105A (EVOH)<br>4th layer: ADMER ™ QF551A<br>5th layer: 3576 PP/0400 PB/3340 EAA (3:3:2) + 250 ppm Mn + 2% OA (Q) |
| 160 | 1st layer: 3576 PP/0400 PB (3:1) + 250 ppm Mn + 2% OA (Q)<br>2nd layer: ADMER ™ QF551A<br>3rd layer: EVAL ™ 105A (EVOH)<br>4th layer: ADMER ™ QF551A<br>5th layer: 3576 PP/0400 PB (3:1) + 250 ppm Mn + 2% OA (0) |
| 161 | 1st layer: 3576 PP/0400 PB (1:1) + 250 ppm Mn + 2% OA + Irganox 1010 (Q)<br>2nd layer: ADMER ™ QF551A<br>3rd layer: EVAL ™ 105A (EVOH)<br>4th layer: ADMER ™ QF551A<br>5th layer: 3576 PP/0400 PB (1:1) + 250 ppm Mn + 2% OA + IRGANOX ™ 1010 (Q) |

Resistance to permeation of oxygen and moisture vapor was measured for the multilayered barrier films of Examples 157–161. Oxygen transmission rate ($O_2TR$) was determined using an Ox-Tran™ 1000H machine (Mocon, Inc., Minneapolis, Minn.). $O_2TR$ was collected at 25° C. and zero percent (0%) relative humidity. A square sample of each multilayer film was placed in the testing cell of the Ox-Tran™ oxygen permeability tester. Two samples of each film were tested in adjacent cells. Since the Ox-Tran™ 1000H machine has ten test cells, up to five films could be examined at any one time.

Each cell was purged for at least 24 hours with a "carrier" gas of nitrogen containing 1–3% hydrogen prior to testing, to remove any residual oxygen in the sample, cell and system. After purging was completed, a sample of the gases in each cell was tested for residual oxygen content or oxygen "leak rate". The leak rate value determined at each cell was used as the cell's residual oxygen baseline.

Next, each cell was conditioned for another 24 hours by passing 100% oxygen over one side of the sample. Oxygen on the other side of the sample was measured after this conditioning period. This total oxygen content included the amount of oxygen which permeated through the film plus any residual oxygen in the system. To obtain oxygen transmission rate through the film, the leak rate value was subtracted from the total oxygen measured.

Oxygen transmission rate data was collected for each film at 25° C. and 0% relative humidity. The values reported are the average of rates determined for two samples. Since oxygen transmission rate is inversely proportional to thickness, all values were normalized to a standard gas barrier layer thickness of 25μ by multiplying the oxygen transmission rate value by the ratio of barrier layer thickness to 25μ.

Moisture vapor transmission rate (MVTR) for the Example films was determined using a Permatran™-W6 (Mocon, Inc., Minneapolis, Minn.). MVTR data was collected at 38.6° C. and one-hundred percent (100%) relative humidity. The reported values are the average of the values obtained for at least three samples of each Example film. Since MVTR is inversely proportional to thickness, all values were normalized to a standard moisture barrier layer thickness of 25μ (microns) by multiplying the MVTR value by the ratio of moisture barrier layer thickness (being the sum of the moisture barrier and adhesive layer thicknesses, as reported in Table 3 herein) to 25μ. The oxygen transmission rates ($O_2TR$) and moisture vapor transmission rates (MVTR) for Examples 157–161 are reported in Table 15. These rates demonstrate good oxygen and moisture barrier properties for the Example barrier films of the present invention.

TABLE 15

Oxygen transmission rates ($O_2TR$), as expressed in $cc/m^2$/day-atmosphere, and moisture vapor transmission rates (MVTR), as expressed in $g/m^2$/day-atmosphere, for Examples 157–161.

| Ex. No. | Casting Roll Temp. (°C.) | $O_2TR$ ($cc/m^2$/d-atm) | MVTR ($g/m^2$/d-atm) |
|---|---|---|---|
| 157 | 66 | 38.2 | 5.7 |
| 158 | 10 | 3.2 | 9.3 |
| 159 | 10 | 4.7 | 6.9 |
| 160 | 10 | 6.8 | — |
| 161 | 10 | 8.4 | — |

The various modifications and alterations of this invention will be apparent to those skilled in the art without departing from the scope and spirit of this invention, and this invention should not be restricted to that set forth herein for illustrative purposes.

What is claimed is:

1. A degradable multilayered structure comprising:
   (a) a first layer of a polyolefin polymer containing a prodegradant system comprising from about 5 ppm to about 2000 ppm of a transition metal in the form of a salt; and
   (b) a second layer of a polyolefin polymer contacting the first layer of the multilayered structure; wherein the polyolefin polymer of the first layer, the second layer, or the first and second layers comprises a quenched mesophase propylene-based material, wherein said multilayered structure is radiation-resistant.

2. A degradable multilayered structure according to claim 1, wherein at least one of the polyolefin polymers is selected from the group consisting of polypropylene polymer, polyethylene polymer, polybutylene polymer, and combinations thereof.

3. A degradable multilayered structure according to claim 1, wherein the ratio of the thickness of the first layer to the thickness of the second layer is from about 1:10 to about 1000:1.

4. A degradable multilayered structure according to claim 1, wherein the ratio of the thickness of the first layer to the thickness of the second layer is from about 1:1 to about 10:1.

5. A degradable multilayered structure according to claim 1, wherein the mesophase propylene-based material is selected from the group consisting of mesomorphous polypropylene, a mesopolymer blend, a mesocopolymer, and combinations thereof.

6. A degradable multilayered structure according to claim 1, wherein the mesophase propylene-based material of the second layer contains the prodegradant system.

7. A degradable multilayered structure according to claim 1, further comprising a third layer of a polyolefin polymer contacting the surface of the first layer of the multilayered structure opposite from the surface contacted by the second layer of the multilayered structure.

8. A degradable multilayered structure according to claim 7, wherein the ratio of the thickness of the first layer to the thickness of the third layer is from about 1:10 to about 1000:1.

9. A degradable multilayered structure according to claim 7, wherein the ratio of the thickness of the first layer to the thickness of the third layer is from about 1:1 to about 10:1.

10. A degradable multilayered structure according to claim 7, wherein the polyolefin polymer of the third layer comprises a mesophase propylene-based material selected from the group consisting of mesomorphous polypropylene, a mesopolymer blend, a mesocopolymer, and combinations thereof.

11. A degradable multilayered structure according to claim 1, further comprising a layer of a naturally biodegradable polymer contacting the first, the second layer, or the first and second layers of the multilayered structure.

12. A degradable multilayered structure according to claim 1, wherein the structure will oxidatively degrade to embrittlement within about 14 days at a temperature of about 49° C.

13. A degradable multilayered structure according to claim 1, wherein the transition metal is selected from the group consisting of cobalt, manganese, copper, cerium, vanadium and iron.

14. A degradable multilayered structure according to claim 13 wherein the prodegradant system further comprises an auto-oxidative component.

15. A degradable multilayered structure according to claim 14, wherein the auto-oxidative component is selected from the group consisting of a fatty acid, a substituted fatty acid, a derivative of a fatty acid, and combinations thereof.

16. A degradable multilayered structure according to claim 15, wherein the fatty acid has 10 to 22 carbon atoms.

17. A degradable multilayered structure according to claim 16, wherein the auto-oxidative component comprises from about 0.1 to about 10 weight percent, based on the total weight of the first layer, and provides at least about 0.1 weight percent of unsaturated species and at least about 0.1 weight percent of free acid species in the first layer.

18. A degradable multilayered structure according to claim 17, wherein the fatty acid comprises an unsaturated fatty acid.

19. A degradable multilayered structure according to claim 17, wherein the auto-oxidative component comprises an admixture of saturated fatty acids and unsaturated fatty acid esters.

20. A degradable multilayered structure according to claim 18, wherein the unsaturated fatty acid substantially comprises species having two or more double bonds.

21. A degradable multilayered structure according to claim 17, wherein the structure will oxidatively degrade to embrittlement within 14 days at 60° C. and a relative humidity of at least 80%.

22. A degradable multilayered structure according to claim 1, wherein the transition metal is present at a concentration of from about 25 to about 500 parts per million.

23. A degradable multilayered structure according to claim 1, wherein the first layer the second layer, or the first and second layer, further comprises an anti-oxidant at a concentration of from about 0.02 to about 0.2 weight percent.

24. A degradable multilayered structure according to claim 1, wherein the first layer, the second layer, or the first and second layers further comprise a naturally biodegradable polymer at a concentration of from about 5 to about 50 weight percent.

25. A degradable multilayered structure according to claim 1, wherein the structure comprises a tube, a pouch, a bag, a tape, or a transdermal drug delivery patch.

26. A degradable multilayered barrier film comprising:
   (a) a gas barrier layer of a chlorine-free, naturally biodegradable polymer, the gas barrier layer being substantially impermeable to oxygen gas; and
   (b) a moisture barrier layer of a quenched mesophase propylene-based material contacting the gas barrier layer, and containing a prodegradant system comprising from about 5 ppm to about 2000 ppm of a transition metal in the form of a salt, wherein said multilayered film is radiation-resistant.

27. A multilayered barrier film according to claim 26, wherein the chlorine-free, naturally biodegradable polymer is a vinyl-alcohol containing polymer.

28. A multilayered barrier film according to claim 27, wherein the vinyl-alcohol-containing polymer is selected from the group consisting of ethylene vinyl alcohol copolymer, poly(vinyl alcohol) copolymer, and combinations thereof.

29. A multilayered barrier film according to claim 26, wherein the chlorine-free, naturally biodegradable polymer exhibits a permeability to oxygen gas of less than about 100 cc/m$^2$/d-atm at 25° C. and 0% relative humidity.

30. A multilayered barrier film according to claim 26, wherein the chlorine-free, naturally biodegradable polymer exhibits a permeability to oxygen gas of less than about 30 cc/m$^2$/d-atm at 25° C. and 0% relative humidity.

31. A multilayered barrier film according to claim 26, wherein the mesophase propylene-based material is selected from the group consisting of mesomorphous polypropylene, a mesopolymer blend, a mesocopolymer, and combinations thereof.

32. A multilayered barrier film according to claim 26, wherein the transition metal is selected from the group consisting of cobalt, manganese, copper, cerium, vanadium and iron.

33. A multilayered barrier film according to claim 26, further comprising a layer of a polyolefin polymer containing the prodegradant system contacting the gas barrier layer.

34. A multilayered barrier film according to claim 33, wherein the polyolefin polymer is selected from the group consisting of polypropylene polymer, polyethylene polymer, polybutylene polymer, and combinations thereof.

35. A multilayered barrier film according to claim 33, wherein the polyolefin polymer comprises a mesophase propylene-based material selected from the group consisting of mesomorphous polypropylene, a mesopolymer blend, a mesocopolymer, and combinations thereof.

36. A multilayered barrier film according to claim 26, further comprising a layer of a polyolefin polymer contacting the moisture barrier layer.

37. A multilayered barrier film according to claim 26, wherein the prodegradant system further comprises an auto-oxidative component comprising a fatty acid, a substituted fatty acid, a derivative of a fatty acid, or combinations thereof.

38. A multilayered barrier film according to claim 26, wherein the barrier film will oxidatively degrade to embrittlement within about 14 days at a temperature of about 49° C.

39. A compostable multilayered barrier film comprising:
   (a) a gas barrier layer of a chlorine-free, naturally biodegradable polymer, the gas barrier layer being substantially impermeable to oxygen gas; and
   (b) a moisture barrier layer of a quenched mesophase propylene-based material contacting the gas barrier layer, the quenched mesophase material containing a prodegradant system of an auto-oxidative component comprising a fatty acid, substituted fatty acid or derivatives, or blends thereof, the fatty acid having 10 to 22 carbon atoms, said auto-oxidative component being at between about 0.1 to 10 weight percent based on the total composition wherein the auto-oxidative component provides at least 0.1 weight percent of unsaturated species and at least 0.1 weight percent of free acid species in the total composition, and from 5 to 2000 ppm of a transition metal in the form of a salt wherein the transition metal is selected from the group consisting of cobalt, manganese, copper, cerium, vanadium and iron, wherein said multilayered film is radiation-resistant.

40. A compostable multilayered barrier film according to claim 39, wherein the chlorine-free, naturally biodegradable polymer is a vinyl-alcohol containing polymer selected from the group consisting of ethylene vinyl alcohol copolymer, poly(vinyl alcohol) copolymer, and combinations thereof.

41. A compostable multilayered barrier film according to claim 39, wherein the chlorine-free, naturally biodegradable polymer exhibits a permeability to oxygen gas of less than about 100 cc/m$^2$/d-atm at 25° C. and 0% relative humidity.

42. A compostable multilayered barrier film according to claim 39, wherein the naturally biodegradable polymer of the gas barrier layer comprises ethylene vinyl alcohol copolymer containing the prodegradant system.

43. A compostable multilayered barrier film according to claim 39, wherein in a film form the film will oxidatively degrade to embrittlement within about 14 days at a temperature of about 60° C. and a relative humidity of at least about 80%.

44. A degradable, radiation-resistance composition comprising a quenched mesophase propylene-based material containing a prodegradant system comprising from about 5 ppm to about 2000 ppm of a transition metal in the form of a salt.

45. A degradable composition according to claim 44, wherein the transition metal is selected from the group consisting of cobalt, manganese, copper, cerium, vanadium and iron.

46. A degradable composition according to claim 44, wherein the prodegradant system further comprises an auto-oxidative component comprising a fatty acid, a substituted fatty acid, a derivative of a fatty acid, or combinations thereof.

47. A degradable composition according to claim 44, wherein in a film form, the composition will oxidatively degrade to embrittlement within about 14 days at a temperature of about 49° C.

48. A degradable composition according to claim 44, wherein the composition comprises a film, a fiber, a microfiber, or a tube.

49. A method of containing a perishable material with a degradable packaging film comprising:
   (a) providing a degradable multilayered packaging film comprised of a first layer of a polyolefin polymer containing a prodegradant system comprising from about 5 ppm to about 2000 ppm of a transition metal in the form of a salt, and a second layer of a polyolefin polymer, wherein the polyolefin polymer of the first layer, the second layer or the first and second layers comprises a quenched mesophase propylene-based material, wherein said multilayered film is radiation-resistant; and
   (b) contacting the perishable material with the second layer of the packaging film, wherein the second layer serves to prevent the dispersal of the prodegradant system from the first layer of the packaging film to the perishable material prior to disposal of the packaging film.

50. A method of forming a degradable, radiation resistant article comprising:
   (a) extruding a propylene-based material containing a prodegradant system comprising from about 5 ppm to about 2000 ppm of a transition metal in the form of a salt to form an extrudate; and
   (b) quenching the extrudate immediately after extruding to provide a radiation-resistant article of a mesophase propylene-based material containing said prodegradant system therein.

51. A method of forming a degradable, radiation resistant article according to claim 50, further comprising, coextruding a chlorine-free, naturally biodegradable polymer that is substantially impermeable to oxygen gas along with the propylene-based material containing the prodegradant system to form a multilayered extrudate, and quenching the multilayered extrudate immediately after extruding to form a multilayered article having at least one layer of a mesophase propylene-based material containing the prodegradant system proximate at least one layer of a chlorine-free, naturally biodegradable polymer.

52. A method of using a degradable multilayered film as a barrier film comprising:
   (a) providing a degradable multilayered film comprised of a gas barrier layer of a chlorine-free, naturally biodegradable polymer, the gas barrier layer being substantially impermeable to oxygen gas, and a moisture barrier layer of a quenched mesophase propylene-based material contacting the gas barrier layer, the quenched mesophase propylene-based material containing a prodegradant system comprising from about 5 ppm to about 2000 ppm of a transition metal in the form of a salt, wherein said multilayered film is radiation-resistant; and
   (b) interposing the degradable multilayered film between a protected environment and an external environment such that gases and moisture cannot substantially pass through the degradable multilayered film.

53. A method of using a degradable multilayered film as a barrier film according to claim 52, wherein the degradable multilayered film comprises a packaging film containing a perishable product in the protected environment.

54. A method of using a degradable multilayered film as a barrier film according to claim 53, wherein the perishable product comprises a food product or a pharmaceutical product.

55. A method of using a degradable multilayered film as a barrier film according to claim 52, wherein the compostable multilayered film comprises a transdermal drug delivery patch, medical tape, or an ostomy pouch.

* * * * *

UNITED STATES PATENT AND TRADEMARK OFFICE
CERTIFICATE OF CORRECTION

PATENT NO. : 5,470,526
DATED : November 28, 1995
INVENTOR(S) : Debra L. Wilfong et al.

It is certified that error appears in the above-indentified patent and that said Letters Patent is hereby corrected as shown below:

Second page of title page, Other Publications, "Compositing" should read --Composting--;

Col. 4, Line 24, "forms" should read --form--;
Col. 4, Line 61, "an," should read --and--;
Col. 5, Line 5, "polyolefinpolymers" should read --polyolefin polymers--;
Col. 5, Line 27, "Jar" should read --jar--;
Col. 6, Line 8, "invention" should read --invention;--;
Col. 7, Line 36, "speckles" should read --species--;
Col. 8, Line 8, "thioesteresters: should read --thioetheresters--;
Col. 8, Line 59, "Structures Methods" should read --Structures, Methods--;
Col. 9, Line 2, ".degradation" should read --degradation--;
Col. 9, Line 43, "ale" should read --as--;
Col. 11, Line 24, "biodegradablepoly-" should read -- biodegradable poly---;
Col. 11, Line 63, "Structure" should read --structure--;
Col. 13, Line 2, "olefinpolymers" should read --olefin polymers--;
Col. 13, Line 16, "polyolefinpolymers" should read --polyolefin polymers--;
Col. 14, Line 20, "enhances" should read --enhance--;
Col. 14, Line 24, "mesomorphouspolypropy-" should read --mesomorphous polypropy---;
Col. 14, Line 49, "plunge( into" should read --plunge into--;
Col. 14, Line 52, "out" should read --about--;
Col. 14, Line 58, "here" should read --Where--;
Col. 16, Line 3, "temperatures;" should read --temperatures--;
Col. 18, Table 3 Footnotes 3,."PP/PB" should read --PP/PE--;
Col. 18, Table 3, Footnotes 3, "MPI" should read --MFI--;
Col. 18, Table 3, Footnote 5, "MPI" should read --MFI--;
Col. 18, Table 3, Footnote 6, "PP/PB" should read --PP/PE--;
Col. 18, Table 3, Footnote 6, "Hastman" should read --Eastman--;
Col. 19, Table 4, Ex. No. 47, insert --6180-- before "HDPE";
Col. 19, Table 4, Ex. No. 49, "169" should read --69--;
Col. 19, Table 4, Ex. No. 52, "Mn" should read --MMn--;
Col. 19, Table 4, Ex. No. 58, "PP/PB" should read --PP/PE--;
Col. 19, Table 4, Ex. No. 61, "31" should read --31.5--;
Col. 19, Table 4, Ex. No. 62, "141" should read --41--;

UNITED STATES PATENT AND TRADEMARK OFFICE
CERTIFICATE OF CORRECTION

PATENT NO. : 5,470,526

DATED : November 28, 1995

INVENTOR(S) : Debra L. Wilfong et al.

It is certified that error appears in the above-indentified patent and that said Letters Patent is hereby corrected as shown below:

Col. 22, Table 6, Ex. No. 76, "230" should read --130--;
Col. 23, Table 7, Table Heading, insert "Examples 80-82--;
Col. 23, Table 7, Table Heading, insert "Examples 83-89 (1 mil LDPE Films)--;
Col. 24, Table 8, Third Column, "55°" should read --88°--;
Col. 26, Line 19, "densitypolyethylene" should read --density polyethylene--;
Col. 27, Table 11, Ex. No. 124, "1550P" should read --5A95--;
Col. 27, Table 11, Ex. No. 124, second "OA" should read --OA (Q)--;
Col. 27, Table 11, Ex. No. 125, "1550P" should read --5A95--;
Col. 27, Table 11, Ex. No. 127, "(Q)" should read --(NQ)--;
Col. 27, Table 11, Ex. No. 133, "Kn" should read --Mn--;
Col. 27, Table 11, Ex. No. 133, "5A95 (NQ)" should read --5A95 PP (NQ)--;
Col. 27, Table 11, Ex. No. 135, "(Q)" should read --(NQ)--;
Col. 27, Table 11, Ex. No. 137, "3" should read --39--;
Col. 29, Table 12, Ex. No. 145, "1550P PE" and insert --5A95 PP--;
Col. 31, Line 14, "10A" should read --105A--;
Col. 32, Table 14, Ex. No. 160, "(O)" should read --(Q)--;
Col. 35, Line 5, "first layer" should read --first layer,--;
Col. 36, Line 48, "resistance" should read --resistant--;

Signed and Sealed this

Twenty-fourth Day of December, 1996

Attest:

BRUCE LEHMAN

Attesting Officer

Commissioner of Patents and Trademarks